(12) United States Patent
Popa et al.

(10) Patent No.: US 7,596,559 B2
(45) Date of Patent: Sep. 29, 2009

(54) CONSTRAINT-BASED XML QUERY REWRITING FOR DATA INTEGRATION

(75) Inventors: Lucian Popa, Morgan Hill, CA (US); Cong Yu, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 10/975,213

(22) Filed: Oct. 28, 2004

(65) Prior Publication Data
US 2006/0101073 A1 May 11, 2006

(51) Int. Cl.
G06F 7/00 (2006.01)
G06F 17/30 (2006.01)
(52) U.S. Cl. .................................. 707/7; 707/104.1
(58) Field of Classification Search .............. 707/1–10, 707/100–104.1, 200–206; 715/234, 239
See application file for complete search history.

(56) References Cited

U.S. PATENT DOCUMENTS

2002/0194220 A1* 12/2002 Sluiman .................... 707/513

OTHER PUBLICATIONS

Reynaud et al., "Semantic Integration of XML Heterogeneous Data Sources," pp. 199-208, IEEE 2002.*
J. Hunter, "MetaNet—A Metadata Term Thesaurus to Enable Semantic Interoperability Between Metadata Domains," Journal of Digital Information, vol. 1, issue 8, 2001.*
R. Bourret et al., "A Generaic Loac/Extract Utility for Data Transfer Between XML Documents and Relational Databases," IEEE 2002.*
Simpson et al, "Access 97", pp. 365 and 366, Sybex (1997).*
Yokota et al., Semantic extensions of XML for advanced applications, Jan. 29-30, 2001, IEEE, 49-57.*
Chippimolchai et al., Semantic query formulation and evaluation for XML databases, Dec. 12-14, 2002, IEEE, 205-214.*
Reynaud, et al., Xyleme, a dynamic warehouse for XML data of the Web, Jul. 16-18, 2001, IEEE, 199-208.*
Madhavan, et al., "Representing and Reasoning About Mappings Between Domain Models", 2002, American Association for Artificial Intelligence, 7 pages.

* cited by examiner

*Primary Examiner*—Jean B Fleurantin
*Assistant Examiner*—John E Breene
(74) *Attorney, Agent, or Firm*—Gibb I.P. Law Firm, LLC

(57) ABSTRACT

A system and method for data integration by querying multiple extensible markup language (XML) source schemas through a common XML target schema, wherein the system comprises XML mapping connections between the XML source schemas and the XML target schema, wherein the XML mapping connections accommodate XML mappings, the XML source schemas comprise data, and the XML target schema comprise a set of constraints, which comprise data merging rules for integrating the data from multiple source schemas comprising overlapping information; a target query associated with the target schema; and a query rewriter adapted to reformulate the target query in terms of the source schemas based on the mappings, and to integrate the data based on the set of constraints. The query rewriter is adapted to rewrite the target query into a set of source queries comprising the source schemas. A processor evaluates a union of the set of source queries.

22 Claims, 15 Drawing Sheets

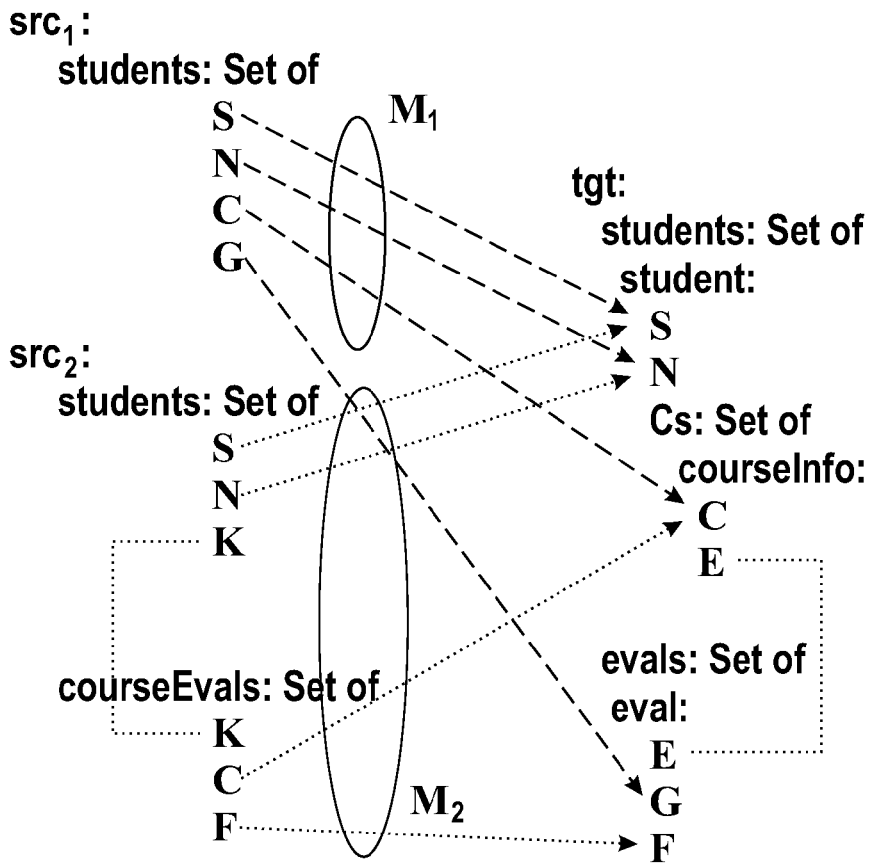

$M_1$: foreach $s$ in $src_1$.students
    exists $s'$ in tgt.students, $c'$ in $s'$.student.Cs,
        $e'$ in tgt.evals
      where $c'$.courseInfo.E = $e'$.eval.E
    with    $s'$.student.S = $s$.S and $s'$.student.N = $s$.N and
        $c'$.courseInfo.C = $s$.C and $e'$.eval.G = $s$.G $M_2$: foreach $s$ in $src_2$.students, $c$ in $src_2$.courseEvals
    where $s$.K = $c$.K
    exists $s'$ in tgt.students, $c'$ in $s'$.student.Cs,
        $e'$ in tgt.evals
      where $c'$.courseInfo.E = $e'$.eval.E
    with    $s'$.student.S = $s$.S and $s'$.student.N = $s$.N and
        $c'$.course.C = $c$.C and $e'$.eval.F = $c$.F

FIG. 1

$(q_1)$ for $s$ in tgt.students, $c$ in $s$.student.Cs, $e$ in tgt.evals
  where $c$.courseInfo.E = $e$.eval.E
  return [ name = $s$ student.N, course = $c$.courseInfo.C,
      grade = $e$.eval.G, file = $e$.eval.F ]
$(q_2)$ for $s$ in tgt.students
  return [ name = $s$.student.N,
      results = for $s'$ in tgt.students, $c$ in $s'$.student.Cs,
          $e'$ in tgt.evals
        where $c'$.courseInfo.E = $e'$.eval.E and
          $s'$.student.N = $s$.student.N
        return [ result = [ grade = $e'$.eval.G,
            file = $e'$.eval.F] ]

FIG. 2

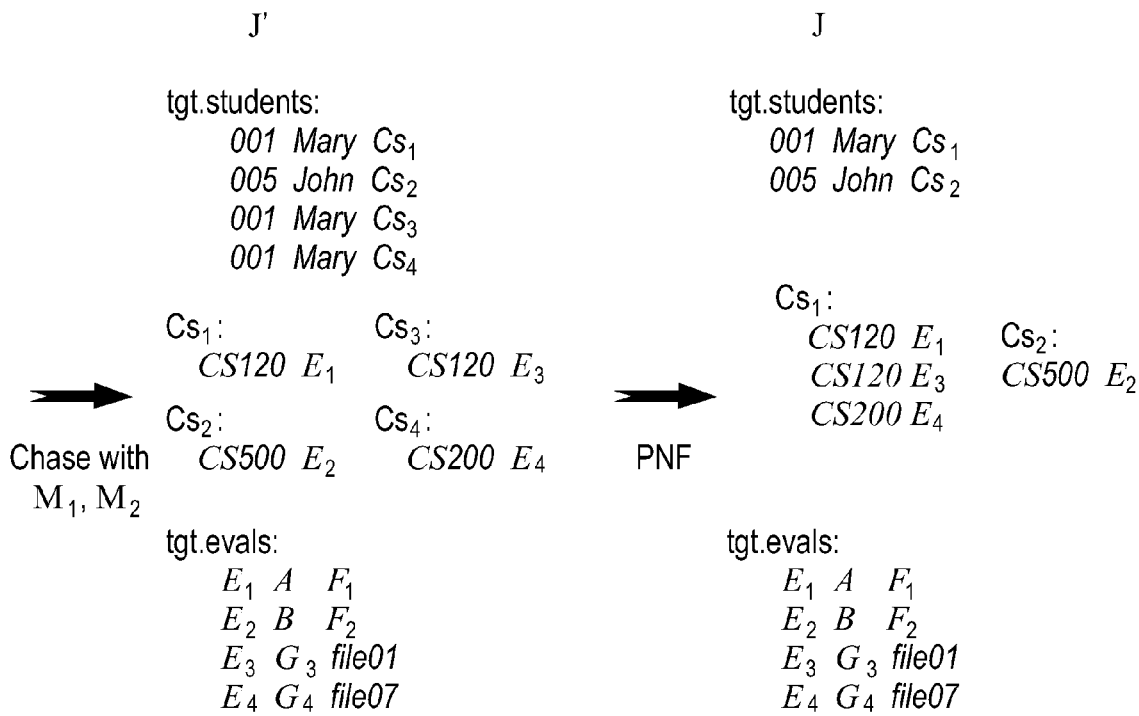

FIG. 3

$(R_0)$ tgt = [ students = $SK_{tgt.0}()$, evals = $SK_{tgt.1}()$ ]

$(R_{14})$ $SK_{tgt.0}$ = $\lambda()$ . {
    for $s$ in $src_1$.students
    return [ student = [ S = $s$.S, N = $s$.N,
                         Cs = $SK_{tgt.0.0.2}(s.S,s.N)$]]
$\cup$
for $s$ in $src_2$.students, $c$ in $src_2$.courseEvals
where $s$.K = $c$.K
return [ student = [ S = $s$.S, N = $s$.N,
               Cs = $SK_{tgt.0.0.2}(s.S, s.N)$]] }

$(R_{25})$ $SK_{tgt.0.0.2}$ = $\lambda(l_1, l_2)$ . {
    for $s$ in $src_1$.students
    where $l_1$ = $s$.S and $l_2$ = $s$.N
    return [ courseInfo = [ C = $s$.C,
                             E = $SK_{125}(s.S,s.N,s.C,s.G)$]]
$\cup$
for $s$ in $src_2$.students, $c$ in $src_2$.courseEvals
where $s$.K = $c$.K and $l_1$ = $s$.S and $l_2$ = $s$.N
return [ courseInfo = [ C = $c$.C,
               E = $SK_{127}(s.S,s.N,c.C,c.F)$]] }

$(R_{36})$ $SK_{tgt.1}$ = $\lambda()$ . {
    for $s$ in $src_1$.students
    return [ eval = [ E = $SK_{125}(s.S,s.N,s.C,s.G)$, G = $s$.G,
                    F = $SK_{126}(s.S,s.N,s.C,s.G)$]]
$\cup$
for $s$ in $src_2$.students, $c$ in $src_2$.courseEvals
where $s$.K = $c$.K
return [ eval = [ E = $SK_{127}(s.S,s.N,c.C,c.F)$,
              G = $SK_{128}(s.S,s.N,c.C,c.F)$, F=$c$.F]] }

FIG. 5

Input: target query $q$, set of mapping rules $R$
1. Initialize list $L$ and $Q_s$
2. go = $q[root \rightarrow body(R_{root})]$
3. Mark go top query, and add it to $L$
4. while $L$ is not empty
5.     $q_e = L.\textbf{removeFirst}$
6.     if exists $\{g_i \text{ \underline{in} } SK_{setID}(...)\}$ in $q_e$ .for:
7.         $Q_e = q_e[SK_{setID} \rightarrow body(R_{setID})]$
8.         Add all queries in $Q_e$ to $L$ and continue
9.     else if $q_e$ .return contains subqueries:
10.        for each subquery $q_{sub}$ :
11.           Assign a unique $QryID$ to $q_{sub}$
12.           let $\vec{E}$ be the sequence of all distinct expressions in $q_{sub}$ that refer to any variable in $q_e$ .for
13.           $q_{sub} = q_{sub}[\vec{E} \rightarrow (l_o, ..., l_k)]$ and add $q_{sub}$ to $L$
14.           $q_e = q_e[q_{sub} \rightarrow SQ_{QryID}(\vec{E})]$
15.        Add $q_e$ to $Q_s$ and continue
16.     else Add $q_e$ to $Q_s$ and continue

Output: the set $Q_s$ of translated and decorrelated queries

Lambda Substitution Rule:
$\{\lambda(l_1, ..., l_n).\{E\}\}(e_1, ..., e_n) \Rightarrow E[l_1 \rightarrow e_1, ..., l_n \rightarrow e_n]$

Union Separation Rule:
<u>for</u> ..., $g_i$ <u>in</u> $\{Q_1 \cup ... \cup Q_n\}$ ...
<u>where</u> $B$ <u>return</u> $r$
$\Downarrow$ <u>for</u> ..., $g_i$ <u>in</u> $\{Q_1\}$ ,...      <u>for</u> ..., $g_i$ <u>in</u> $\{Q_n\}$,...
<u>where</u> $B$ <u>return</u> $r$   $\cup ... \cup$   <u>where</u> $B$ <u>return</u> $r$

De-Nesting Rule:
<u>for</u> $x_1$ <u>in</u> $X_1$, ..., $x_n$ <u>in</u> $X_n$,
    $g$ <u>in</u> {<u>for</u> $y_1$ <u>in</u> $Y_1$, ..., $y_k$ <u>in</u> $Y_k$ <u>where</u> $B$ <u>return</u> $r$ },
    $z_1$ <u>in</u> $Z_1$, ..., $z_m$ <u>in</u> $Z_m$
<u>where</u> $B_0$ <u>return</u> $r_0$
$\Downarrow$ <u>for</u> $x_1$ <u>in</u> $X_1$, ..., $x_n$ <u>in</u> $X_n$, $y_1$ <u>in</u> $Y_1$, ..., $y_k$ <u>in</u> $Y_k$,
    $z_1$ <u>in</u> $Z_1[g \rightarrow r]$, ..., $x_m$ <u>in</u> $Z_m[g \rightarrow r]$
<u>where</u> $B_0[g \rightarrow r]$ <u>and</u> $B$ <u>return</u> $r_0[g \rightarrow r]$

Record Peojection Rule:
$[..., l_i = r_i, ...].l_i \Rightarrow r_i$

FIG. 6 for $s$ in $SK_{tgt.0}()$, $c$ in $s$.student.$Cs$, $e$ in $SK_{tgt.1}()$
where $c$. courseInfo. E = $e$.eval.E
return [ name=$s$.student. N, course=$c$.courseInfo.$C$,
  grade=$e$.eval.G, file=$e$.eval.F ]

(step 1) ⇓ Substitute $SK_{tgt.0}$ for $s'$ in $src_1$.students, $c$ in $SK_{tgt.0.0.2}(s'.S, s'.N)$,
  $e$ in $SK_{tgt.1}()$
where $c$.courseInfo.E = $e$.eval.E
return [ name=$s'.N$, course=$c$.courseInfo.C,
  grade=$e$.eval.G, file=$e$.eval.F ]

(step 2 and 3) ⇓ Substitute $SK_{tgt.0.0.2}$ and $SK_{tgt.1}$ for $s'$ in $src_1$.students, $c'$ in $src_1$.students, $e'$ in $src_1$.students
where $SK_{125}(c'.S, c'.N, c'.C, c'.G) = SK_{125}(e'.S, e'.N, e'.C, e'.G)$
  and $s'.S=c'.S$ and $s'.N=c'.N$
return [ name=$s'.N$, course=$c'.C$, grade=$e'.G$,
  file=$SK_{126}(e'.S, e'.N, e'.C, e'.G)$ ]

FIG. 7

*(top)* for $s$ in $SK_{tgt.0}()$
return [ name=$s$.student.N,
　　　　results=for $s'$ in tgt.students, $c$ in $s'$.student.Cs,
　　　　　　　　$e'$ in tgt.evals
　　　　　　　　where $c'$.courseInfo.E = $e'$.eval.E and
　　　　　　　　　　　$s'$.student.N = $s$.student.N
　　　　　　　　return [result = [ grade = $e'$.eval.G,
　　　　　　　　　　　　　file = $e'$.eval.F ] ]

(step 1) ⇓ (substitution)

*(top)* for $s_1$ in $src_1$.students
return [ name=$s_1$.N,
　　　　results= for $s'$ in tgt.students, $c$ in $s'$.student.Cs,
　　　　　　　　$e'$.in tgt.evals
　　　　　　　　where $c'$.courseInfo.E = $e'$.eval.E and
　　　　　　　　　　　$s'$.student.N = $s_1$.N
　　　　　　　　return [ result = [ grade = $e'$.eval.G,
　　　　　　　　　　　　　file = $e'$.eval.F ] ]

(step 2) ⇓ (decorrelation)

*(top)* for $s_1$ in $src_1$.students
return [ name=$s_1$.N, results= $SQ_{201}(s_1.N)$ ]
　　　　+

$(SQ_{201}(I_0))$
for $s'$ in tgt.students, $c$ in $s'$.student.Cs, $e'$ in tgt.evals
where $c'$.courseInfo.E = $e'$.eval.E and $s'$.student.N = $I_0$
return [ result = [ grade = $e'$.eval.G, file = $e'$eval.F ] ]

FIG. 8

Input: source query $q_s$:

> for p in P
> where $B_1(p)$ and $F(t_1, \ldots, t_2) = G(t'_1, \ldots, t'_k)$
> return $O(p)$ source constraint $c_s$:

> for r in R [ $B_2(r) \rightarrow F(e_1, \ldots, e_2) = G(e'_1, \ldots, e'_k)$ ]

1. Compute equalities to unify the two Skolem term equalities:

$\Theta(p, r) = (t_1 = e_1)$ and ... and $(t_l = e_l)$ and
   $(t'_1 = e'_1)$ and ... and $(t'_k = e'_k)$ 2. Generate contained rewriting $r$ by "unioning" $q_s$ and $c_s$, and then eliminating the Skolem term equality > for p in P, r in R
   > where $B_1(p)$ and $B_2(r)$ and $\Theta(p, r)$
   > return $O(p)$ 3. Find minimal subset ($r_0$ in $R_0$) of (r in R) so that the induced subquery $r^m$ (see below) is equivalent to $r$.

> for p in P, $r_0$ in $R_0$
   > where $B_1(p)$ and $B'_2(r_0)$ and $\Theta'(p, r_0)$
   > return $O(p)$

Output: Rewriting $r^m$.

FIG. 10

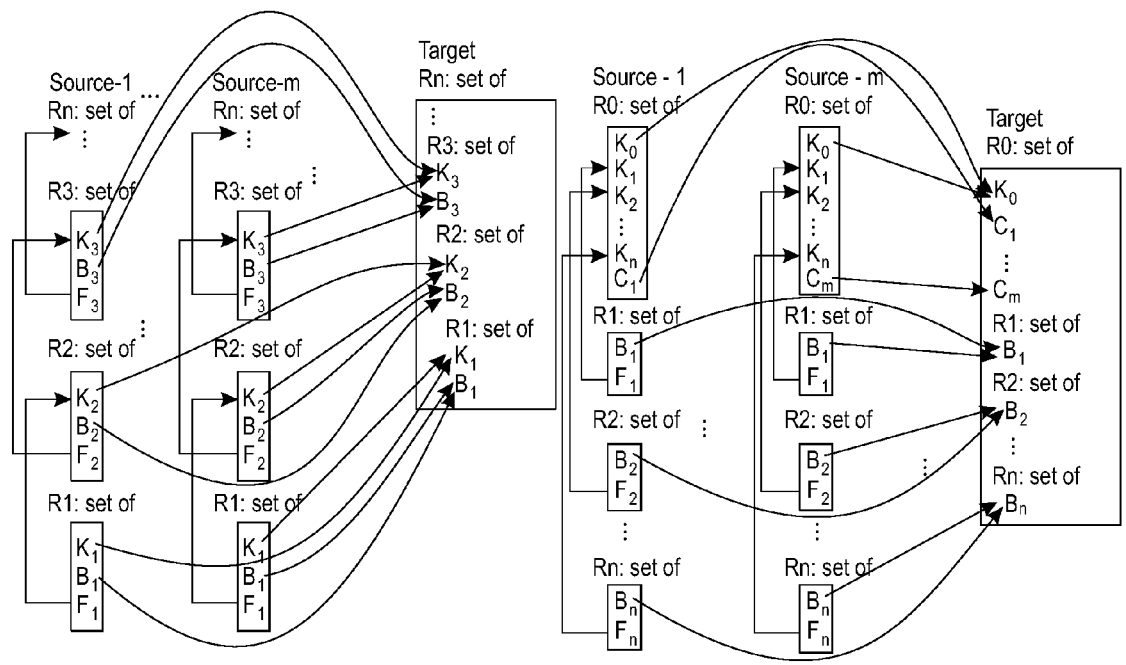

Chain Query 1: a single-variable query
for $r$ in doc()/Target/$R_n$ return $r/B_n$
Chain Query 2: a three-variable query
for $r_n$ in doc()/Target/$R_n$, $r_{n-1}$ in $r_n/R_{n-1}$, $r_{n-2}$ in $r_{n-1}/R_{n-2}$
return $r_{n-2}/B_{n-2}$

Authority Query 1: an $m$-way merging query
for $r$ in doc()/Target/$R_0$
return <result> {$r/C_1$} {$r/C_2$} ... {$r/C_m$} </result>
Authority Query 2: a three-variable query
for $r_0$ in doc()/Target/$R_0$, $r_1$ in $r_0/R_1$, $r_n$ in $r_0/R_n$,
return <result> {$r_1/B_1$} {$r_n/B_n$} </result>
Authority Target Constraint:
every $r_1$ in doc()/Target/$R_0$, $r_2$ in doc()/Target/$R_0$
satisfies if $r_1/K_0 = r_2/K_0$
    then $r_1/C_1 = r_2/C_1$ and ... and $r_1/C_m = r_2/C_m$

FIG. 11

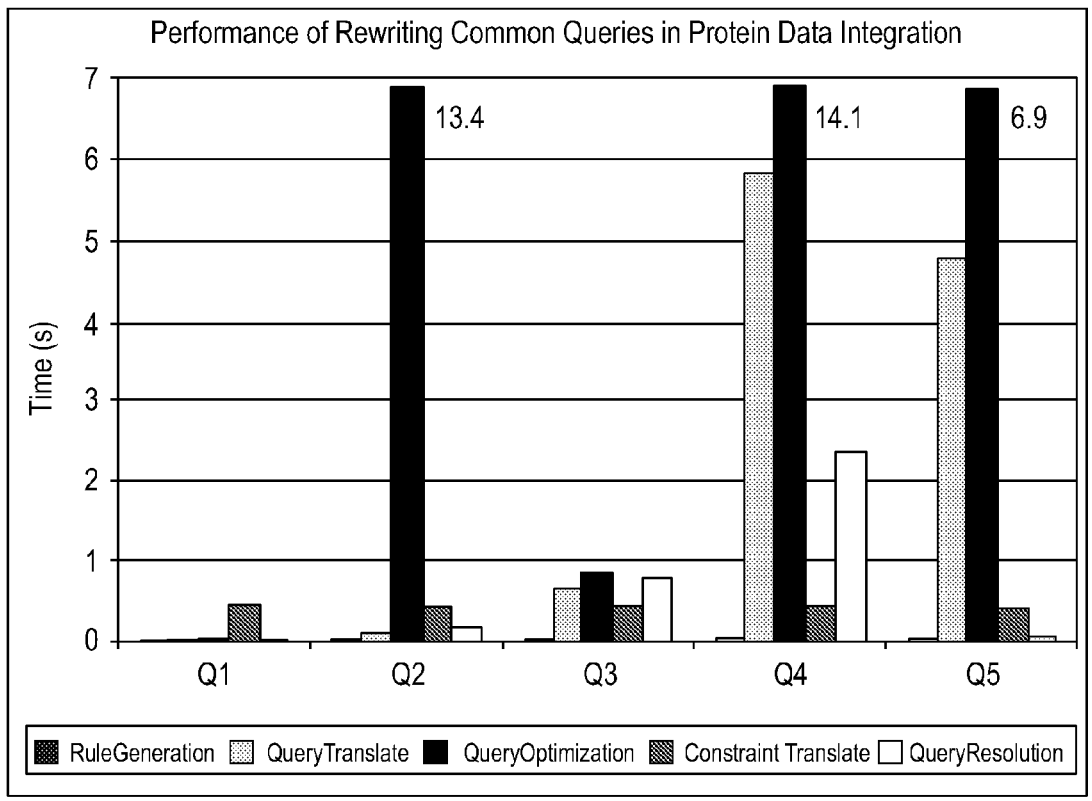

Q5: Find "NFKB" interaction chains with length 3
for $o in doc()/root/org, $a in $o/obj, $ai in $a/obj_inter,
$an in $a/obj_name, $b in $o/obj, $bi in $b/obj_inter
where $an/name = "NFKB" and $ai/inter_with/id = $b/id
return <result>
       { for $bn in $b/obj_name return $bn/name }
       { for $c in $o/obj
        where $bi/inter_with/id = $c/id
        return <names>
            { for $cn in $c/obj_name return $cn/name }
        </names>
</result>

FIG. 14

CONSTRAINT-BASED XML QUERY REWRITING FOR DATA INTEGRATION

BACKGROUND OF THE INVENTION

1. Field of the Invention

The embodiments of the invention generally relate to the data integration problem associated with mappings, and more particularly to the problem of efficient answering of queries through a target schema, given a set of mappings between the data source schema(s) and the target schema.

2. Description of the Related Art

The data inter-operability problem arises from the fact that data, even within a single domain of application, is available at many different sites, in many different schemas, and even in different data models (e.g., relational and Extensible Markup Language (XML)). The integration and transformation of such data has become increasingly important for many modern applications that need to support their users with informed decision making. As a rough classification, there are two basic forms of data inter-operability: data exchange and data integration. Data exchange (also known as data translation) is the problem of moving and restructuring data from one (or more) source schema(s) into a target schema. A relational schema is a graphical depiction of a database structure expressed in text database language defining the tables, the fields in each table, and the relationship between the fields and tables. An XML schema is a description of the structure of an XML document, whereby an XML schema defines the XML elements that can appear in an XML document, the sub-elements and/or the attributes of each XML element, and the relationship between the XML elements. An XML schema is expressed in XML Schema Definition (XSD), a standardized language for defining the structure, content, and semantics of XML documents. Data exchange appears in many tasks that require data to be transferred between independent applications that do not necessarily agree on a common data format. In contrast, data integration is the problem of uniformly querying many different sources through one common interface (target schema). There is no need to materialize a target instance in this case. Instead, the emphasis is on answering queries over the common schema. In both cases of data exchange and data integration, relationships or mappings must first be established between the source schemas and the target schema.

Mappings are often specified as high-level, declarative, assertions that state how groups of related elements in a source schema correspond to groups of related elements in the target schema. Mappings can be given by a human user or they can be derived semi-automatically based on the outcome of schema matching algorithms. Mappings have been used for query rewriting in relational data integration systems, in the form of GAV (global-as-view), LAV (local-as-view) or, more generally, GLAV (global-and-local-as-view) assertions. They have also been used to formally specify relational data exchange systems. A more general form of GLAV that accounts for XML-like structures has been used to give semantics for mappings between XML schemas and to generate the data transformation scripts (in sequential query language (SQL), XML Query Language (XQuery), or Extensible Style Language Transformation (XSLT)) that implement the desired data exchange.

There has been considerable work on XML and semistructured query rewriting, and focus on query optimization by rewriting semistructured queries in terms of materialized views. Some of the conventional solutions address the problem of publishing SQL data in XML by rewriting XML queries into SQL queries. In fact, the conventional techniques also provide solutions on XML-to-SQL translation. In most of the above cases, the source (materialized views, relational store, etc.) to target (XML logical schema, XML view, etc.) mapping is lossless; i.e., it consists of statements (whether explicit or implicit) each asserting that some portion of the XML data is equal to some portion of the relational (store) data. Hence, query rewriting is equivalence preserving. In contrast, most real-life mappings in data integration are lossy and generally offer an incomplete and partial view of the data sources. Moreover, the conventional techniques for XML query rewriting generally fail to work in the presence of such lossy mappings. Additionally, because they assume that the mappings are lossless, the conventional techniques can be used to retrieve generally only a limited subset of the possible answers.

Generally, when a user wants to query multiple heterogeneous data sources, he/she typically formulates a query in terms of a user or target interface (or schema). However, the data resides under different formats or schemas that are the source schemas. Typically, the relationships between the source schemas and the target schema are given in the form of mappings between the sources and the target. In order to answer queries over the target, the query processing system generally has to translate the query from the target schema into queries that use the source schemas. The latter queries can then be evaluated on the data sources to retrieve the answers.

A known solution to this problem is the federated relational database approach in which the mapping between the target schema and the source schemas is specified by letting the target be a view over the source data bases. Then, the query processing subsystem applies query composition techniques to compose the user query with the view to obtain queries formulated in terms of the sources. The main drawback to this approach is that the known techniques are typically confined to the relational model, wherein the sources and the target must be relational, and the queries must be SQL. Other existing solutions generally cannot provide XML views to data sources. Moreover, an important problem in accessing heterogeneous data sources with overlapping information is data merging.

Existing solutions generally do not provide any support for automatic data merging. Under existing approaches, users have to explicitly create views that "know" how to merge the data by joining the data sources. Such an approach does not work well in dynamic environments where new data sources may often appear, since in such a case, the views have to be rewritten by a human user in order to account for the new data sources. These views are often complex and the effort required in their design is considerable. Therefore, due to the drawbacks of the conventional approaches there remains a need for a novel XML query technique used for data integration.

SUMMARY OF THE INVENTION

In view of the foregoing, an embodiment of the invention provides a system for data integration by querying multiple extensible markup language (XML) source schemas through a common XML target schema, wherein the system comprises XML mapping connections between the XML source schemas and the XML target schema, wherein the XML mapping connections accommodate XML mappings, the XML source schemas comprise data, and the XML target schema comprise a set of constraints; a target query associated with the XML target schema; and a query rewriter adapted to reformulate the target query in terms of the XML source schemas based on the XML mappings, and to integrate the data based on the set of constraints. The set of constraints comprise data merging rules for integrating the data from multiple XML source schemas comprising overlapping information. The query rewriter is adapted to rewrite the target query into a set of source queries comprising the source XML schemas. The system further comprises a processor adapted to evaluate a union of the set of source queries, wherein the evaluation of the union of the set of source queries in the processor occurs at query run-time. Moreover, the target query comprises an XML query (XQuery) and the XML source schemas comprise any of relational and hierarchical XML schemas. Additionally, the XML mappings comprise lossy mappings.

Another embodiment of the invention provides a method of data integration comprising establishing XML mappings between XML source schemas and an XML target schema, wherein the XML source schemas comprise data and the XML target schema comprise a set of constraints; querying multiple XML source schemas through a common XML target schema, wherein the common XML target schema defines a set of terms and a structure that a target query can refer to; rewriting the target query in terms of the XML source schemas based on the XML mappings; and integrating the data based on the set of constraints, wherein the set of constraints comprise data merging rules for integrating the data from multiple XML source schemas comprising overlapping information. The method further comprises rewriting the target query into a set of source queries comprising the source XML schemas and evaluating a union of the set of source queries, wherein the evaluation of the union of the set of source queries occurs at query run-time. Moreover, the target query comprises an XQuery, the XML source schemas comprise any of relational and hierarchical XML schemas, and the XML mappings comprise lossy mappings.

Another aspect of the invention provides a program storage device readable by computer, tangibly embodying a program of instructions executable by the computer to perform a method of data integration, the method comprising establishing XML mappings between XML source schemas and an XML target schema, wherein the XML source schemas comprise data and the XML target schema comprise a set of constraints; querying multiple XML source schemas through a common XML target schema, wherein the common XML target schema defines a set of terms and a structure that a target query can refer to; rewriting the target query in terms of the XML source schemas based on the XML mappings; and integrating the data based on the set of constraints.

Another embodiment of the invention provides a method of integrating data comprising rewriting an XQuery comprising a target XML schema into a set of queries comprising XML source schemas comprising data; considering data merging rules expressed as XML target constraints; and merging, using the data merging rules, the data by evaluating data joins between multiple XML source schemas.

An additional embodiment of the invention provides a system of integrating data comprising a query rewriter adapted to rewrite an XQuery comprising a target XML schema into a set of queries comprising XML source schemas comprising data; a processor adapted to consider data merging rules expressed as XML target constraints; and a data merger adapted to merge, using the data merging rules, the data by evaluating data joins between multiple XML source schemas.

The embodiments of the invention provide a mapping and constraint based XML query rewriting system and method. The techniques provided by the embodiments of the invention can be applied in various XML or relational data integration scenarios for answering queries through a virtual target schema. The semantics of such query answering in the presence of both mappings and target constraints is defined and used as the basis for the system. Mappings can be incomplete, and this gives flexibility to the design of the data integration system. The incorporation of target constraints ensures that various parts of the same data entity, though residing at different sources, are merged and presented to the user as a whole. Two novel methodologies are implemented: the basic query rewriting methodology transforms target queries into source queries based on mappings, while the query resolution methodology generates additional source queries to merge related data based on the constraints. Moreover, experimental evaluation demonstrate that the system scales well with increasing complexities of the mapping scenario and the target query, and is practical in a real data integration scenario drawn from the life sciences domain.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 1 is a diagram illustrating a schema and mapping scenario according to an embodiment of the invention;

FIG. 2 is a diagram illustrating two queries over the target schema of FIG. 1 according to an embodiment of the invention;

FIG. 3 is a diagram illustrating a canonical target instance according to an embodiment of the invention;

FIG. 5 is a diagram illustrating a set of mapping rules according to an embodiment of the invention;

FIG. 6 is a diagram illustrating a query translate methodology according to an embodiment of the invention;

FIG. 7 is a diagram illustrating an example of the iterative steps during the rewriting of a query according to an embodiment of the invention;

FIG. 8 is a diagram illustrating a substitution and decorrelation process of a query according to an embodiment of the invention;

FIG. 10 is a diagram illustrating a resolution step methodology according to an embodiment of the invention;

FIG. 11 is a diagram illustrating chain and authority scenarios used to evaluate a system according to an embodiment of the invention;

FIG. 14 is a graphical representation illustrating the comparative performance of rewriting common queries in a protein data integration process as implemented according to an embodiment of the invention;

DETAILED DESCRIPTION OF PREFERRED EMBODIMENTS OF THE INVENTION

Figure 4:
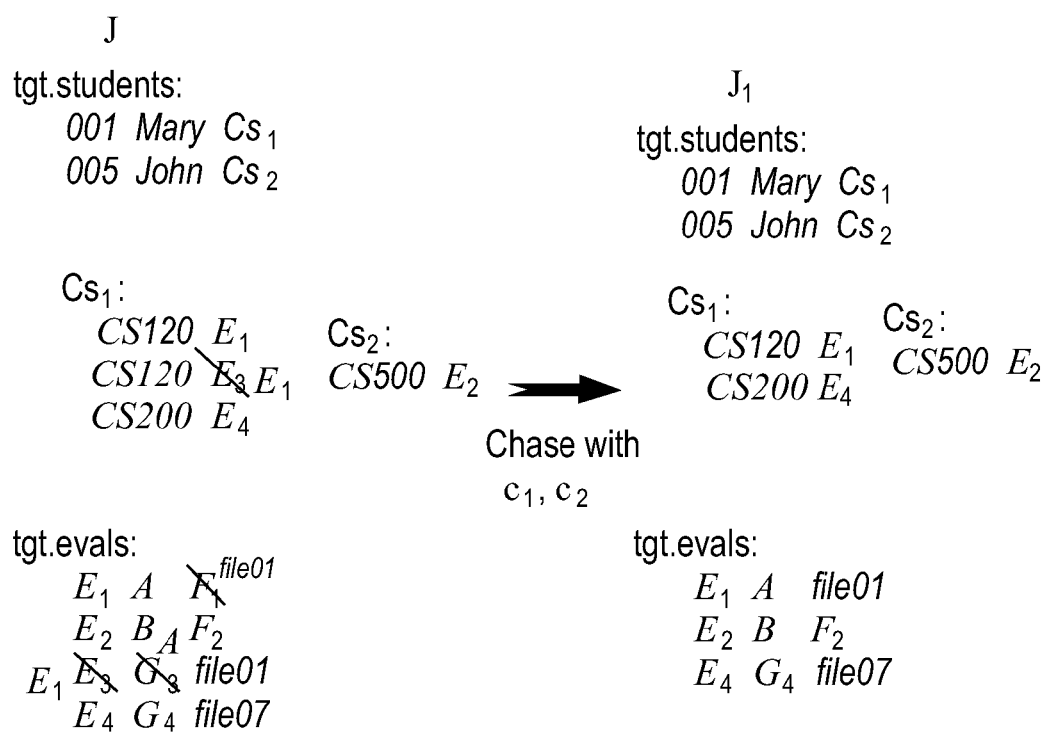
FIG. 4 is a diagram illustrating a chase process with target constraints according to an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a novel XML query technique used for data integration. The embodiments of the invention address this need by providing a query rewriting system and method that rewrites an XQuery query formulated in terms of a target XML schema into a set of queries formulated in terms of the source XML schemas, and supports automatic data merging by incorporating, automatically, joins between data sources. These joins can involve multiple sources and are generated, at query run-time, by considering data merging rules expressed as target constraints. This is opposed to having human experts explicitly write complex joins that require global knowledge of all the data sources as is typical of conventional solutions. According to the embodiments of the invention, the target constraints are simply part of the design of the target schema. Referring now to the drawings and more particularly to FIGS. 1 through 17 where similar reference characters denote corresponding features consistently throughout the figures, there are shown preferred embodiments of the invention.

While most of the conventional approaches focus on the relational case, the embodiments of the invention consider queries and mappings over both relational and XML schemas. Moreover, the embodiments of the invention consider, as part of the mapping scenario, a set of constraints on the target schema. The presence of such target constraints is significant because they can be used to express data merging rules that arise when integrating data from multiple sources with overlapping information. Data merging is notoriously hard for data integration and often not dealt with in conventional approaches. Integration of scientific data, however, offers many complex scenarios where data merging is required. For example, proteins (each with a unique protein id) are often stored in multiple biological databases, each of which independently maintains different aspects of the protein data (e.g., structures, biological functions, etc.). When querying on a given protein through a target schema, it is important to merge all its relevant data (e.g., structures from one source, functions from another) given the constraint that protein id identifies all components of the protein.

In general, when target constraints are present, it is not enough to consider only the mappings for query answering. The target instance that a query should "observe" must be defined by the interaction between all the mappings from the sources and all the target constraints. This interaction can be quite complex when schemas and mappings are nested and when the data merging rules can enable each other, possibly, in a recursive way. Hence, one of the first problems that the embodiments of the invention address is what it means, in a precise sense, to answer the target queries in the "best" way, given that the target instance is specified, indirectly, via the mappings and the target constraints. Another problem that the embodiments of the invention address is how to compute the correct answers without materializing the full target instance, via two novel methodologies that rewrite the target query into a set of corresponding source queries.

With regard to the problem of query answering over a virtual target, consider an example of mappings between two relational source schemas and a nested target schema. An example of a target query and source instances is provided below and he intuitive result to the query is illustrated. Next, constraints are added on the target to show how this impacts the expected answer to the (same) query. Using the examples, the semantics of query answering are formulated.

The mapping scenario in FIG. 1 illustrates two source relational schemas ($src_1$ and $src_2$), a target nested schema (tgt), and two mappings between them. The schemas are shown in a nested relational representation (further described below) that is used as a common data model to represent both relational schemas and XML Schema. The symbols S, N, C, G, and F represent, respectively, "student id", "studentname", "course", "grade" (only in $src_1$), and "file evaluation" (a written evaluation that a student receives for a course; only in $src_2$). Information in the two sources may overlap, whereby the same student may appear in both sources. The attribute K in $src_2$ is used to link students with the courses they take. The target schema includes a root element tgt comprising two sub elements: students and evals. The first sub element contains zero or more student elements. The keyword SetOf is used to denote that the value of students is a set of student elements. A student is a complex element containing atomic elements, S, N, as well as a set element, Cs, containing course related entries (courseInfo). A course entry contains a course (C), while the grade (G) and file evaluation (F) for that course are stored separately under evals. The element E plays a "linkage" role as it is, in XML Schema terms, a key for eval, and a keyref in courseInfo.

In general, a schema is a set of labels (called roots), each with an associated type $\tau$, defined by:

$$\tau ::= \text{String} \mid \text{Int} \mid \text{SetOf } \tau \mid \text{Rcd}[l_1 : \tau_1, \ldots, l_n : \tau_n] \mid \text{Choice}[l_1 : \tau_1, \ldots, l_n : \tau_n]$$

Types Int and String are called atomic types, SetOf is a set type, and Rcd and Choice are complex types. With respect to XML Schema, SetOf is used to model repeatable elements (or repeatable groups of elements). In FIG. 1, only set elements are marked with their type. Complex and atomic elements are represented implicitly as elements with sub elements and, respectively, as leaves, while Rcd and Choice are used to represent the "all" and "choice" model-groups. SetOf represents unordered sets. "Sequence" model-groups of XML Schema are also represented as unordered Rcd types.

Two mappings are defined in FIG. 1, from the two source schemas to the target schema. Graphically, the mappings are described by the arrows that go between the "mapped" schema elements. However, the precise semantics of these mappings is embedded in $M_1$ and $M_2$, which are also called logical mappings. Each of them is, essentially, a constraint of the form $Q^S \rightarrow Q^T$, where $Q^S$ (the foreach clause and its associated where clause) is a query over the sources and $Q^T$ (the exists clause and its associated where clause) is a query over the target. These mappings specify a containment assertion: for each tuple returned by $Q^S$, there must exist a corresponding tuple in $Q^T$. The with clause explicitly indicates how the source and the target elements relate to each other.

Mapping $M_1$ specifies how student tuples in the first source relate to student, courseInfo, and eval elements in the target. The exists and the where clauses specify how the target elements themselves relate to each other (and to the root of the schema). For example, the generator c' in s'.student.Cs asserts that each courseInfo element (denoted by the variable c') must be an element of the set s'.student.Cs. Also, the target join condition c'.courseInfo.E=e'.eval.E specifies how a courseInfo element relates to an eval element. Similarly, mapping $M_2$ specifies how student information in the second source relates to student, courseInfo, and eval elements in the target. The difference from the first mapping is that the student and course information is split across two tables and a source join condition must be used (s.K=c.K).

With regard to the mapping language, an expression is defined by the grammar e::=S|x|e.l, where x is a variable, S is a schema root, l is a label, and e.l is a record projection. Then, a mapping is a statement (constraint) of the form:

M::=foreach $x_1$ in $g_1, \ldots, x_n$ in $g_n$
where $B_1$
exists $y_1$ in $g'_1, \ldots, y_m$ in $g'_m$
where $B_2$
with $e'_1=e_1$ and ... and $e'_k=e_k$ where each $x_i$ in $g_i(y_j$ in $g'_j)$ is called a generator and each $g_i(g'_j)$ is an expression e with type SetOf$\tau$, the variable $x_i(y_j)$ binds to individual elements of the set e. The mapping is well-formed if the variable (if any) used in $g_i(g'_j)$ is defined by a previous generator within the same clause. Any schema root used in the foreach or exists clause must be a source or target schema root, respectively. The two where clauses ($B_1$ and $B_2$) are conjunctions of equalities between expressions over $x_1, \ldots, x_n$, or $y_1, \ldots, y_m$, respectively. They can also include equalities with constants (i.e., selections). Finally, each equality $e'_i=e_i$ in the with clause involves a target expression $e'_i$ and a source expression $e_i$, of the same atomic type.

The mapping language allows for partial specifications. For example, mapping $M_1$ specifies a grade, but not a file evaluation, while for $M_2$ the opposite is true. Also, the value of E is not specified by either $M_1$ or $M_2$, although this value plays an important correlation role and it appears in the target where clause. The advantage of such mappings is that the system can be defined, incrementally, from incomplete mappings that are independent of each other and that do not attempt to (or cannot) fully specify the target. This becomes more important when target constraints are added to the mappings.

The queries use instances as input and create values as output. Hence, instances and values are defined as follows. Given a schema, an instance is defined as a set of values for the roots, with the requirement that the types must be respected. A value of type Rcd $[l_1:\tau_1, \ldots, l_k:\tau_k]$, called a record value, is an unordered tuple of label-value pairs: $[A_1=a_1, \ldots, A_k=a_k]$, where $a_1, \ldots, a_k$ are of types $\tau_1, \ldots, \tau_k$, respectively. A value of type SetOf$\tau$ is a special value called a SetID. Each such SetID can be associated with a set $\{v_1, \ldots, v_n\}$ of values of type $\tau$ (these are the elements of the set). This representation of sets (using SetIDs) is consistent with the graph or tree-based models of XML, where elements are identified by their node id rather than by their contents. The association between a SetID S and its elements $\{v_1, \ldots, v_n\}$ is denoted by facts of the form: $S(v_1), \ldots, S(v_m)$. The following are two source instances, $src_1$ and $src_2$, for the source schemas in FIG. 1: $src_1$=[students=$S_1$], and $src_2$= [students=$S_2$, courseEvals=C], where $S_1$, $S_2$, and C are SetIDs with the following associated facts (for simplicity, the field labels and the angle brackets surrounding the record values are not included):

$S_1$(001, Mary, CS120, A), $S_1$(005, John, CS500, B)
$S_2$(001, Mary, K7), $S_2$(001, Mary, K4)
C(K7, CS120, file01), C(K4, CS200, file07)

FIG. 2 shows two queries over the target schema of FIG. 1. The queries are written in an XQuery-like notation, using the for-where-return style of syntax; queries with let clauses are not in the syntax, although they can be represented using subqueries in the for clause and then rewritten to eliminate these subqueries. This notation is the internal nested relational language into which external queries in XQuery syntax are translated. Query $q_1$ asks for all tuples with name, course, grade and file for that course. Record expressions (e.g., [name=s.student.N, ... ]) are used to construct and to group elements together in the return clause. Query $q_2$ constructs nested output by using a subquery that returns a set of results (with grade and file) for each student.

The queries that we consider have the following general form:

q::=for $x_1$ in $g_1, \ldots, x_n$ in $g_n$
where B
return r where r is defined by r::=$[A_1=r_1, \ldots, A_k=r_k]$|e|q, and $g_i$, e, B are defined as with mappings. Both source and target schema elements can be used in q and in fact, during rewriting, a partially rewritten query will mix target and source schema elements. This language is termed CQ (core queries). Additionally, CQ allows for Skolem functions wherever an expression e can be used. Skolem functions, which are further described below, play an important role in describing "unknown" values as well as SetIDs. In the implementation of the embodiments of the invention, features such as user functions, arithmetic operations, inequalities, etc., are allowed in the query, though they are not part of CQ. An important subclass of CQ is one in which queries cannot have subqueries. This fragment is termed $CQ_0$.

Given a set of source instances (e.g., $src_1$ and $src_2$), and given a set of mappings (e.g., $M_1$ and $M_2$), the answers to a target query such as $q_1$ can be determined as follows. The conventional techniques, in the relational techniques on query answering using views as well as in query answering in incomplete databases, considers the set of all possible target instances J that are consistent with the mappings and the source instances and then takes the intersection of $q_1(J)$ over all such J. This intersection is called the set of the certain answers. Conversely, the embodiments of the invention take a different approach, which has a more constructive flavor and can be generalized to the cases of XML queries. This approach extends the work on semantics of relational data exchange and query answering based on universal solutions.

Moreover, this approach, as further shown below, is more inclusive than the semantics by certain answers, even in the relational case.

The semantics of target query answering are defined by constructing a canonical target instance J based on the source instances and the mappings. Intuitively, this is what a user would see if we are to materialize a target instance that is consistent with the given sources and mappings. Then, the result of a target query is defined to be the result of evaluating it on J. The construction of the canonical target instance is described below.

For each combination of tuples in the sources that matches the foreach clause and its where clause of a mapping we add tuples in the target so that the exists clause and its where clause are satisfied. The atomic values being added are either equal to source values (if the with clause specifies this equality) or they are created as new and "unknown" values (called nulls). Every generated null is different from the other nulls and source values unless the mapping or some target constraint specifies otherwise. In addition to creating nulls, SetIDs are also generated. For the example source instance $src_1$, the tuple [001, Mary, CS120, A] matches $M_1$, thus three related tuples are added: a student tuple[001, Mary, $Cs_1$] under tgt.students, a courseInfo tuple [CS120, $E_1$] under $Cs_1$, and an eval tuple [$E_1$, A, $F_1$] under tgt.evals. Here, $Cs_1$ is a newly generated SetID, while $E_1$ and $F_1$ are nulls. The same null $E_1$ is used to fill in the two E elements in courseInfo and eval as required by the mapping via the condition c'.courseInfo.E=e'.eval.E in the exists clause. The target instance that results after filling in all the necessary target tuples is the instance J' of FIG. 3. The process described informally here is called the chase. Finally, the mapping also specifies some implicit grouping conditions that the target must satisfy. In particular, in any set there cannot be two distinct tuples that agree on all the atomic valued elements, component wise, but do not agree on the set-valued elements (if any). For example, the three tuples under tgt.students that involve Mary all have the same atomic values but different SetIDs: $Cs_1$, $Cs_3$, and $Cs_4$. Such instance is not allowed. Instead, the three tuples are collapsed into one by identifying the three SetIDs. Hence, the three singleton sets containing courseInfo for Mary are merged into one set (identified by $Cs_1$; see the instance J in FIG. 3). The resulting instance J is in the so-called Partitioned Normal Form (or PNF). PNF is a basic form of data merging that is consistent with most user requirements. The instance J is then the canonical instance.

The evaluation of $q_1$ on J produces the following set of tuples: {[Mary, CS120, A, $F_1$], [John, CS500, B, $F_2$], [Mary, CS120, $G_3$, file01], [Mary, CS200, $G_4$, file07]}. For $q_1$, the following rewritings are generated:

($r_1$) for s in $src_1$.students
   return [name=s.N, course=s.C, grade=s.G, file=null]

($r_2$) for s in $src_2$.students, e in $src_2$.courceEvals
   where s.K=e.K
   return [name=s.N, course=e.C, grade=null, file=e.F]

Evaluating $r_1 \cup r_2$ on the sources ($src_1$ and $src_2$) gives precisely the above four tuples that would be obtained by evaluating $q_1$ on J. This is modulo the fact that the null values for grade and file have all been replaced by one single null value. In general, "unknown" values can be replaced by null at the end of the rewriting process, as long as the corresponding schema element is nullable in the target schema. This would not be the case if we were to return one of the two E elements: E plays an integrity role (key/keyref) and cannot be nullable. The rewritings would then include Skolem terms to explicitly construct values for E.

The relational chase has been used to study the semantics of data exchange as well as query answering in. The conventional canonical universal solution would correspond to the canonical target instance provided by the embodiments of the invention, if the embodiments of the invention are restricted to the relational model. A nested extension of the chase is used here.

Next, it is determined under which conditions the answers to the target query include "merged" tuples that, for example, fuse the grade and the file for Mary and CS120 in the running example. The answer relies on the use of the target constraints to specify data merging rules. For example, the following constraints can be specified on the target instance for the mapping scenario of FIG. 1

($c_1$) for $s_1$ in tgt.students, $c_1$ in $s_1$.student.Cs, $s_2$ in tgt.students, $c_2$ in $s_2$.student.Cs,
   [$s_1$.student.S=$s_2$.student.S and
   $c_1$.courseInfo.C=$c_2$.courseInfo.C
   →$c_1$.courseInfo.E=$c_2$.courseInfo.E]

($c_2$) for $e_1$ in tgt.evals, $e_2$ in tgt.evals
   [$e_1$.eval.E=$e_2$.eval.E
   →$e_1$.eval.G=$e_2$.eval.G and $e_1$.eval.F=$e_2$.eval.F]

The constraint $c_1$ asserts that there must be at most one evaluation id (E) for a given pair of student id (S) and course (C), while $c_2$ asserts that E must be a primary key of the set tgt.evals. Both constraints are functional dependencies; however $c_1$ is a functional dependency that goes across nested sets. These constraints are termed NEGDs (nested equality-generating dependencies). The general form is: for $x_1$ in $g_1, \ldots, x_n$ in $g_n$ [$B_1 \rightarrow B_2$], where $g_i$, $B_1$, and $B_2$ are defined as with mappings and queries. NEGDs capture XML Schema key constraints as well as forms that are not expressible by XML Schema (e.g., $c_1$).

Recalling the source instances given earlier for the example and the canonical instance J constructed in FIG. 3, given the additional specification with $c_1$ and $C_2$, J is no longer an accurate view of the sources. In particular, the constraints $c_1$ and $c_2$ are not satisfied (there are two distinct E values for Mary and CS120). The new canonical instance is defined to be the result of additional chasing of J with the target constraints. FIG. 4 shows how J is transformed into $J_1$ via this chase. Concretely, whenever two distinct nulls are required to be equal by some constraint, the equality is enforced by identifying one with the other. Similarly, if a null is required to be equal to a source value, it is enforced by replacing the null with the source value. At the end the PNF procedure may need to be reapplied. The result, $J_1$, is now the "correct" view of the sources. It now includes only one tuple containing all the information (grade and file) about Mary and CS120. The semantics of target query answering to be the result of evaluating the query on this canonical target instance is then used.

For the example, if $q_1$ is evaluated on $J_1$, then the following is obtained: {[Mary, CS120, A, file01], [John, CS500, B, $F_2$], [Mary, CS200, $G_4$, file07]}. The first tuple correctly "fuses" data from the two sources. One of the main contributions is the technique to produce such tuples that are consistent with the mappings and the target constraints, without materializing a canonical instance, but instead by additional transformation of the query (via resolution). In particular, an additional rewriting is obtained for $q_1$ that joins the two sources on student id and course, and produces the "fused" tuple (it is assumed that the student id (S) functionally determines the student name (N)):

($r_3$) for s in $src_1$.students, s' in $src_2$.students,
e'in $src_2$.courseEvals
where s'.K=e'.K and s.S=s'.S and s.C=e'.C
return [name=s.N, course=s.C, grade=s.G, file=e'.F]

With regard to query rewriting requirements, supposing I is a source instance, $\Sigma_{st}$ is a set of mappings, and $\Sigma_t$ is a set of target constraints (NEGDs), and are all arbitrary. In general, there can be multiple canonical instances J for I due to the fact that the chase may choose different names for the nulls, or the sequence in which the mappings and constraints are applied may be different. However, the important fact about canonical instances is that they behave essentially the same when queries in $CQ_0$ are evaluated on them. A target instance K is a solution with respect to I, $\Sigma_{st}$, and $\Sigma_t$ (or solution, in short), if K satisfies the constraints of $\Sigma_{st} \cup \Sigma_t$ for the given I.

Suppose, q is a $CQ_0$ query. Then, the set of the PNF-certain answers of q with respect to I, $\Sigma_{st}$, and $\Sigma_t$, denoted PNF-certain$_{\Sigma_{st} \cup \Sigma_t}$(q, I), is the set of all tuples t such that t∈q(K) for every solution K. Let J be a canonical target instance for I, $\Sigma_{st}$, and $\Sigma_t$. Then, for every $CQ_0$ query q, the q(J)$_\downarrow$=PNF-certain$_{\Sigma_{st} \cup \Sigma_t}$(q, I). Here, q(J)$_\downarrow$ is the result of evaluating q on J and then removing all tuples with nulls.

Thus, $CQ_0$ query evaluation on a canonical instance is essentially the same as computing the certain answers. In general, it is desirable to have a rewriting methodology to produce a rewriting r of q such that r(I)$_\downarrow$=q(J)$_\downarrow$(=PNF-certain$_{\Sigma_{st} \cup \Sigma_t}$(q, I)). Typically, r must be a union of rewritings. Such an r is termed a sound and complete rewriting. When the exact equality is not guaranteed by the methodology and r(I)$_\downarrow$ $\subseteq$ q(J)$_\downarrow$(=PNF-certain$_{\Sigma_{st} \cup \Sigma_t}$(q, I)), it is said that r is a sound rewriting. A methodology that always produces sound rewritings is sound and a methodology that always produces sound and complete rewritings is sound and complete. Thus, the embodiments of the invention provide rewriting methodologies that are sound and, if possible, complete.

For the larger class CQ of queries, the classical notion of the certain answers is no longer sufficient because the answers are no longer flat tuples. However, the canonical target instance is used to define the semantics of query answering, thus going beyond the notion of the certain answers and beyond $CQ_0$. Furthermore, in practice, tuples that contain nulls are not removed during evaluation, that is, r(I)$_\downarrow$ (or q(J)$_\downarrow$) is not computed, but rather r(I) (or q(J)). In that case, the exact equality r(I)=q(J) (or r(I)$\subseteq$q(J)) is not required, since the nulls (as well as the SetIDs in the case of queries that return nested sets) may be named differently. Instead, for sound rewritings, a relaxed version of containment is required: r(I)$\leq$q(J) if there exists a function h mapping the nulls occurring in r(I) into values (null or non-null) of q(J) and mapping the SetIDs occurring in r(I) into SetIDs of q(J), such that the facts of r(I) are mapped into facts of q(J) (when r(I) and q(J) are viewed as nested instances). For sound and complete rewritings, r(I)$\leq$q(J).and q(J)$\leq$r(I).

According to the embodiments of the invention, the methodology that rewrites a target query into a set of source queries based on the mappings is described below. There are four phases in the methodology: rule generation, query translation, query optimization, and query assembly. Rule generation creates a set of mapping rules based on the schemas and the given set of mappings. The mapping rules are then used in the translation phase to reformulate target queries into (unions of) source queries. If the target query has nested subqueries in the return clause, the translation phase also decorrelates the query into a set of stand-alone queries and translates them one by one. The optimization phase removes unsatisfiable source queries and minimizes the satisfiable ones. The assembly phase re-assembles the decorrelated source queries back into queries with nested subqueries, if the original target query is nested. The methodology provided by the embodiments of the invention may be used to handle target constraints by inserting a query resolution phase between the translation and the optimization phases.

Mappings are often incomplete and may specify only a subset of the target elements. The goal of the rule generation phase is to turn this incomplete specification into a set of mapping rules that fully specify the target in terms of the sources, so that target expressions can be substituted by source expressions later. The methodology described below for generating mapping rules uses the example shown in FIG. 1. The inventive methodology starts by generating a rule for each root of the target schema. For the root tgt of our target schema, the following is generated: ($R_0$) tgt= [students=SK$_{tgt.0}$( ), evals=SK$_{tgt.1}$( )]. SK$_{tgt.0}$ and SK$_{tgt.1}$ are 0-ary Skolem functions that are used to generate the SetIDs for the set elements students and evals, respectively. The functions are 0-ary because only one instance of each of these sets must exist, according to the schema. In general, each set type in the target schema is associated with a unique Skolem function that can generate instances (i.e., SetIDs) at that type. The Skolem function depends, in general, on the atomic elements from the current nesting level as well as from the parent and ancestor levels. Once the methodology finishes with the roots, the methodology looks at the mappings. For each mapping and for each generator in the exists clause a rule is constructed. For the generator s' in tgt.students in $M_1$:

($R_1$) SK$_{tgt.0}$( )←
for s in $src_1$.students
return [student=[S=s.S, N=s.N, Cs=SK$_{tgt.0.0.2}$(s.S, s.N)]]

SK$_{tgt.0}$( ) is the head of the rule, while the body of the rule is a query that constructs student elements for the set denoted by SK$_{tgt.0}$( ) (i.e., students). The foreach and associated where clause of the mapping become the for and where clauses of the query, while the source expressions in the with clause are used to fill in values for the atomic elements (s.S and s.N, in this case) in the return clause. For the set type Cs, a Skolem function is used to generate corresponding SetIDs. In this case, a new SetID (and accordingly, a new set of courseInfo elements) is generated for each different combination of s.S and s.N. The name of the Skolem function, SK$_{tgt.0.0.2}$, is generated based on the position of the element Cs in the schema (e.g., it is the second child of the 0th child of tgt). Continuing with the generator c' in s'.student.Cs of $M_1$:

($R_2$) SK$_{tgt.0.0.2}$(s.S, s.N)←
for s in $src_1$.students
return [courseInfo=[C=s.C, E=SK$_{125}$(s.S, s.N, s.C, s.G)]]

This rule populates, with elements, the SetIDs that were created by $R_1$. The head of this rule is a Skolem function with arguments: s.S and s.N. Hence, the rule generates courseInfo elements under a different set SK$_{tgt.0.0.2}$(s.S, s.N), for each different pair of s.S and s.N. Courses for the same student (i.e., same id and name) are grouped together under the same set. This is in accordance with the requirement that the target instance must be in partitioned normal form (PNF). Since $M_1$ does not specify a value for the atomic element E, an atomic type Skolem function (SK$_{125}$ is a system generated name) is used to create a value for it. This function depends on all the source atomic elements that are mapped into the target via the mapping. Finally, one more rule is generated for $M_1$:

($R_3$) $SK_{tgt.1}( )\leftarrow$
    for s in $src_1$.students
        return [eval=[E=$SK_{125}$(s.S, s.N, s.C, s.G), G=s.G, F=$SK_{126}$(s.S, s.N, s.C, s.G)]]

The same function $SK_{125}$ as in $R_2$ is used to generate an E-value. This is because the mapping requires the two E-values to be equal, as specified in the target where clause. In a similar fashion, three more rules are generated from the second mapping, $M_2$:

($R_4$) $SK_{tgt.0}( )\leftarrow$
    for s in $src_2$.students, c in $src_2$.courseEvals
    where s.K=c.K
        return [student=[S=s.S, N=s.N, Cs=$SK_{tgt.0.0.2}$(s.S, s.N)]]

($R_5$) $SK_{tgt.0.0.2}$(s.S, s.N)$\leftarrow$
    for s in $src_2$.students, c in $src_2$.courseEvals
    where s.K=c.K
        return [courseInfo=[C=c.C, E=$SK_{127}$(s.S, s.N, c.C, c.F)]]

The same Skolem function, $SK_{tgt.0.0.2}$, is used in $R_4$ and $R_5$ as in $R_1$ and $R_2$ (as mentioned, such a Skolem function is associated with the set type in the schema and not with a mapping). Hence, if the same student id and name occur in both sources, the course related information is merged under the same set. Again, this reflects the PNF requirement on the target. Such PNF-based merging is a form of data merging across sources that are achieved even without additional target constraints.

After iterating through all the mappings, the methodology provided by the embodiments of the invention merges all the rules with the same Skolem function in the head, to obtain a single definition for each target set type. Essentially, this amounts to taking a union and is straightforward for $SK_{tgt.0}( )$ and $SK_{tgt.1}( )$. However, in the case of combining rules $R_2$ and $R_5$, the union cannot simply be taken since the head is parameterized. Instead the combined effect of the two rules are described by defining (see rule $R_{25}$ in FIG. 5) $SK_{tgt.0.0.2}$ as a function (lambda), with two arguments, $l_1$ and $l_2$, denoting possible student id and name. The function returns a set of associated course entries by combining the bodies of the rules $R_2$ and $R_5$. The two queries used inside $R_{25}$ are now parameterized by $l_1$ and $l_2$. If the same student id and name appear in both sources then both these queries are non-empty and their union is non trivial. FIG. 5 gives all the mapping rules for the example. Evaluating the generated mapping rules on any source instance would give a canonical target instance as described.

The next phase is to translate the target query into a set of source queries based on the mapping rules. The QueryTranslate methodology provided by the embodiments of the invention and shown in FIG. 6 achieves this by iteratively substituting generators in the for clause of the target query with source generators of the matching mapping rules. The set of transformation rules (also in FIG. 6) are applied to transform the rest of the query after each substitution. Both the transformation rules and the QueryTranslate methodology are described below. The notation E[x→y] denotes the result of substituting all occurrences of x in E with y and then recursively applying the transformation rules.

The transformation rules describe the steps involved in transforming a query when an expression in the query is replaced by another expression. There are a total of four rules: 1) Lambda substitution rule: this rule extracts the union of queries (E) from the body of the lambda definition and replaces the lambda variables with the actual arguments. 2) Union separation rule: this rule divides a query whose for clause contains a union of queries into a set of queries without union in the for clause. 3) De-Nesting rule: this rule applies when a query contains an inner query in its for clause. It replaces the generator (g in Q) with the for clause of Q and appends the original where clause to the where clause of Q. Every occurrence of g throughout the query is then substituted with Q's return clause. 4) Record projection rule: intuitively, this rule applies when a record value is projected on one of its labels. The inner value matching the label is returned as the result of the projection. It can be applied multiple times until no projection step is left.

The methodology first substitutes the target root element using the root rule (e.g., $R_0$ in FIG. 5). The result is marked as a top query to differentiate it from a subquery nested inside another query. The query is then added to L, a list of all partially rewritten queries. In these partial queries, whenever a Skolem function occurs in a generator in the for clause, it is substituted with the lambda definition of the corresponding mapping rule. After each substitution step, the methodology applies all the applicable transformation rules and adds the resulting query or queries back to L. Eventually, the for clause will contain only source generators and this marks the completion of the rewriting for this query (without considering its subqueries). If the query contains subqueries, then the methodology decorrelates the parent query from the subqueries (lines 10-14 in FIG. 6) before adding it to the output. Decorrelation serves two purposes: first, it simplifies and improves the performance of the methodology by avoiding unnecessary overhead of examining the parent query when child queries are being processed; second, it simplifies the QueryOptimization and QueryResolution methodologies by relieving them of the complexity of dealing with nested subqueries. During decorrelation, each subquery is assigned a unique QryID; its occurrence in the parent subquery is then substituted by a Skolem query term $SQ_{QryID}(\vec{E})$, where $SQ_{QryID}$ is a fresh Skolem function, and $\vec{E}$ are all the expressions in the subquery that refer to variables in the for clause of the parent query. The subquery itself is added to the working list L, $\vec{E}$ after is replaced by a set of fresh variables $l_0, \ldots, l_k$. These variables will be substituted back with the actual expressions in the assembly phase.

FIG. 7 sketches several steps during the rewriting of query $q_1$ of FIG. 2. The first query shown is the result of substituting the target root tgt using the mapping rule $R_0$ in FIG. 5 and applying record projection afterwards. The target generators are substituted with source generators one by one, until the query becomes a source query. FIG. 8 uses the running query $q_2$ to illustrate decorrelation. After step 1, which substitutes $SK_{tgt.0}$ using rule $R_{14}$, the translation of the top query itself is completed. Since there is a subquery in the return clause, step 2 decorrelates the subquery from the top query by replacing it with $SQ_{201}(s_1.N)$ where $SQ_{201}$ is a new Skolem function associated with this subquery and $s_1.N$ is the expression in the subquery that refers to the parent variable $s_1$. The subquery is marked with the QryID (i.e., 201) and all occurrences of $s_1.N$ are replaced with the variable $l_0$.

The optimization phase includes two components: compilation and minimization. Compilation eliminates the equalities involving Skolem terms that occur in the where clause of a rewriting. Any equality between two Skolem terms that have the same Skolem function, that is, of the form $F(t_1, \ldots, t_k) = F(t'_1, \ldots, t'_k)$ is replaced by the equalities of their arguments: $t_1 = t'_1$ and $\ldots$ and $t_k = t'_k$. In contrast, if a rewriting contains an equality involving two Skolem terms with different Skolem functions or a Skolem term and a non-Skolem term, then the rewriting is marked unsatisfiable (i.e., returning the empty set) and eliminated. This procedure preserves completeness of the methodology as long as there are no target constraints. Minimization is applied afterwards; it eliminates redundant generators by searching for a minimal subset of generators and, hence, minimal query, that can yield the same answers. For query $q_1$, the rewriting obtained after the translation steps shown in FIG. 7 and the compilation and minimization processes are applied to obtain the following minimal rewriting:

for s' in $src_1$.students
return [name=s'.N, course=s'.C, grade=s'.G, file=$SK_{126}$ (s'.S, s'.N, s'.C, s'.G)]

This is the same as the rewriting $r_1$ previously described, provided that the above Skolem function is replaced by null, which is done whenever the value is nullable. The queries that result after rewriting often contain redundancies, and minimization is a key component for the efficient evaluation of such queries.

After optimization, the set of minimized, decorrelated source queries are assembled back into nested queries in the query assembly phase. First, the top queries are identified; there can be a set of top queries since one top query can be rewritten into a set of queries, all of which are top queries. Each Skolem query term with a given QryID in the return clause of a top query is substituted with the union of all queries that are marked with the same QryID. A query is fully assembled when its return clauses (including those inside its subqueries) no longer contain any Skolem query term.

The following is a statement of the correctness and completeness of the basic rewriting methodology with respect to the semantics given by the canonical target instance: Let $\Sigma_{st}$ be a set of mappings. For every core query q over the target, the basic rewriting methodology generates r such that: whenever I is a source instance and J is a canonical target instance for I and $\Sigma_{st}$, then $r(I) \leq q(J)$ (soundness) and $q(J) \leq r(I)$ (completeness). In particular, $r(I)_\downarrow = q(J)_\downarrow = $PNF-certain$_{\Sigma_{st}}(q, I)$, if q is in $CQ_0$.

In the above, r is a union of rewritings. Next, a bound on the number of rewritings generated by QueryTranslate is given for a given $CQ_0$ query (either the input query or a query that results after decorrelation). If k is the size (number of variables) of an input $CQ_0$ query and n is the number of mappings then the number of rewritings generated by QueryTranslate is $O(n^k)$. When target constraints are part of the input, the basic rewriting methodology becomes incomplete. This means that the condition $q(J) \leq r(I)$ is no longer true, that is, $q(J)$ may contain answers that are not reflected in $r(I)$.

Figure 9:
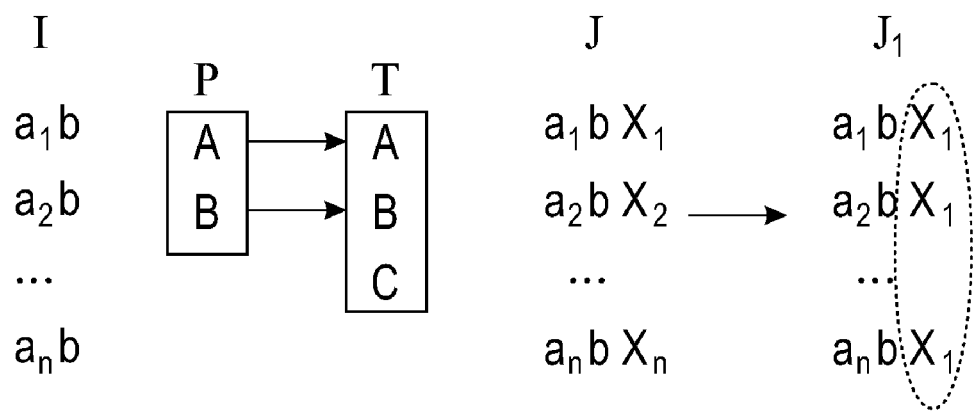
FIG. 9 is a diagram illustrating a mapping scenario with target constraints according to an embodiment of the invention.

The basic rewriting methodology may be extended in order to handle target constraints. The basic methodology may contain some limitation when it comes to target constraints, thus a new methodology called query resolution addresses these limitations. In FIG. 9, the A and B columns of a source relation P are mapped via the mapping M into the A and B columns of a target relation T. The C column represents an identifier that exists at the target but not at the source. A target constraint c asserts that B functionally determines C. FIG. 9 also shows a possible source instance I, as well as the canonical instance J obtained from I based on the mapping M alone, and the canonical instance $J_1$ based on M and c. In particular, $J_1$ reflects the fact that C-values are functionally determined by the B-values. The following target query:

(q) for $t_1$ in T, $t_2$ in T
where $t_1.C = t_2.C$
return [$A_1 = t_1.A, A_2 = t_2.A$]

asks for all pairs of A-values that have the same identifier (C-value). First the case of rewriting q based on M alone is considered. According to the basic query rewriting methodology, a mapping rule R for M is generated, and then q is rewritten by using R into a source query $q_s$:

(R) T=for p in P return [A=p.A, B=p.B, C=F(p.A, p.B)]
($q_s$) for $p_1$ in P, $p_2$ in P
where $F(p_1.A, p_1.B) = F(P_2.A, p_2.B)$
return [$A_1 = p_1.A, A_2 = p_2.A$]

The equality of the C-values has thus been replaced by an equality of two Skolem terms. In effect, the query $q_s$ incorporates reasoning about incomplete information in the form of equalities involving Skolem functions. In the absence of target constraints, the query compilation methodology is applied and the equality of the Skolem terms is replaced by the equalities of the arguments. This replacement resolves the Skolem term equality. After minimization:

($r_1$) for $p_1$ in P return [$A_1 = p_1.A, A_2 = p_1.A$]

The result is a rewriting that, when applied to the source instance I, generates all the "identity" pairs $(a_1, a_1), \ldots, (a_n, a_n)$. This is consistent with the semantics given by the canonical instance J, which is obtained in the absence of c. However, in the presence of c, this set of answers is incomplete. All pairs of the form $(a_i, a_j)$ with $i \neq j$ are also correct answers (consistent with the semantics given by $J_1$). To obtain these additional answers the following observation is made. When the equality of the Skolem terms in $q_s$ is resolved by replacing it with the equalities of the arguments, a contained rewriting is generated by making use of the fact that $(p_1.A = p_2.A$ and $p_1.B = p_2.B)$ implies $F(p_1.A, p_1.B) = F(p_2.A, p_2.B)$. This implication is a trivial one (i.e., it is always true). However, in general, it is possible that additional contained rewritings exist, because of additional conditions that might imply the equality of the two Skolem terms. Rewriting of target NEGDs occurs by applying the same translation methodology that was used for queries. The result is a set of constraints over the source schemas that imply additional equalities between Skolem terms. In the example, the NEGD c is rewritten as a constraint that provides an additional condition (besides the trivial one) under which the two Skolem terms in $q_s$ can be considered equal:

($c_s$) for $p_1$ in P, $p_2$ in P [$p_1.B = p_2.B \rightarrow F(p_1.A, p_1.B) = F(p_2.A, p_2.B)$]

The rewritten constraints are then applied to generate additional ways of resolving equalities involving Skolem functions. For the query $q_s$ and constraint $c_s$, the precondition p1.B=p2.B from $c_s$ are simply added to the where clause of $q_s$. The following rewriting is obtained (also contained in $q_s$ because only an extra condition is added):

for $p_1$ in P, $p_2$ in P
where $p_1.B = p_2.B$ and $F(p_1.A, p_1.B) = F(p_2.A, p_2.B)$
return [$A_1 = p_1.A, A_2 = p_2.A$]

But then $F(p_1.A, p_1.B) = F(p_2.A, p_2.B)$ can be immediately dropped since it is implied by the constraint. The rewriting $r_2$ is then obtained as shown below. The process of generating $r_2$ from $q_s$ is termed a resolution step. The result of the rewriting methodology is now $r_1 \cup r_2$ (and not just $r_1$). Here, $(r_1 \cup r_2)(I)$ includes pairs of the form $(a_i, a_j)$ with $i \neq j$, and in fact, $(r_1 \cup r_2)(I) = q(J_1)$. This is true for all instances I. Thus, $r_1 \cup r_2$ is sound and complete.

($r_2$) for $p_1$ in P, $p_2$ in P
where $p_1.B = p_2.B$
return [$A_1 = p_1.A, A_2 = p_2.A$]

In general, to apply a resolution step, the constraint need not match the query exactly. The complete resolution step is shown in FIG. 10. The notation p in P is used to denote a set of generators $p_1$ in $P_1, \ldots, p_n$ in $P_n$, and p to denote a set of variables $p_1, \ldots, p_n$ (same for r). In essence, the methodology generates a "join" between the query $q_s$ and the constraint $c_s$ (where the join condition ensures that the two Skolem term equalities in the query and, respectively, constraint, match). Then the Skolem term equality in the query becomes implied, given that the constraint is true, and hence eliminated. Among the newly introduced generators and conditions, not all may be necessary. In the final step a minimization procedure is applied that removes the redundant ones. There, an induced subquery is a query obtained by eliminating a subset of generators from the parent query and then "projecting" the parent where clause to contain all the conditions that involve only remaining variables. Checking the equivalence of $r^m$ with r is performed by checking the existence of containment mappings. The minimization procedure and the equivalence check follow well-known techniques.

The above resolution step is applied to eliminate an equality involving Skolem terms in the where clause. Similarly, a resolution step can be used to substitute Skolem terms in the return clause with non-Skolem terms. This style of resolution is the one used on the query q1 of the running example. It generates rewritings of that fuse the grade and file for students in both sources.

For a given query, there can be multiple ways in which one resolution step can be applied, for different constraints, and for different Skolem term equalities in the where clause (or the different Skolem terms in the return clause). The query resolution phase (QueryResolution) is the one which is explored exhaustively in all possible ways of applying resolution steps. For each query $q_s$ that results after query translation, the process begins by applying one resolution step in all possible ways, and generating multiple rewritings. Each rewriting resolves either one Skolem term equality in the where clause or one Skolem term in the return clause of the given query. Then, the process continues with the new rewritings to generate more rewritings. The computation can be viewed as a tree, whose branching factor is given by the multiple ways in which a resolution step can apply to a query. All the generated rewritings (all the nodes in the tree) are contained rewritings of the original $q_s$. Some of these queries may be redundant; also, the same query may be generated twice. All redundant rewritings are eliminated. The remaining ones enter the query optimization and assembly phase, as in the basic rewriting methodology.

Each resolution step eliminates at least one Skolem term equality in the where clause or one Skolem term in the return clause. After the resolution step, it is possible that new Skolem term equalities appear in the where clause of the resulting query. This happens when the applied constraint contains such a Skolem term equality in the left-hand side of the implication. The newly introduced Skolem term equalities can then enable additional resolution steps (in order to resolve them). Thus, this process can be recursive in the sense that constraints can enable each other. In order to guarantee termination of resolution, a natural acyclicity condition is imposed on the shape of the constraints. Here, let F be the set of constraints over the source schema that are obtained by translating the set of target NEGDs based on the mapping rules. If $f_1$ and $f_2$ are constraints in F, it is said that $f_1$ enables $f_2$ and $f_1 \rightarrow f_2$ is written if $f_1$ and $f_2$ are of the following form:

($f_1$) for ... [ ... F( ... )=G( ... ) ... $\rightarrow$ ... ]
($f_2$) for ... [ ... $\rightarrow$ ... F( ... )=G( ... ) ... ]

where F and G are two Skolem functions (possibly the same). Intuitively, if $f_1$ is applied in a resolution step to a query, then $f_2$ becomes applicable in a subsequent resolution step (even though it may not have been applicable before). A directed graph is constructed whose nodes are the constraints in F and whose edges are given by the "enables" relation. It is said that F is acyclic if the corresponding directed graph is acyclic. In the following, the examples are restricted to target NEGDs that, for given schemas and mappings, give rise to an acyclic set F. A typical example of target NEGDs that may violate this condition is the set of two functional dependencies {B→C, C→B} on a target relation T. If F is acyclic, then it can be immediately proven that the resolution is terminating.

The following is a statement of the correctness (soundness) of the rewriting methodology to include the resolution phase. Let $\Sigma_{st}$ and $\Sigma_t$ be a set of mappings and target NEGDs, respectively. For every target CQ query q, the extended methodology generates r such that: whenever I is a source instance and J is a canonical target instance for I, $\Sigma_{st}$, and $\Sigma_t$, then $r(I) \subseteq q(J)$ (soundness). In particular, $r(I)_\downarrow \subseteq q(J)_\downarrow =$ PNF-certain$_{\Sigma_{st} \cup \Sigma_t}(q, I)$, if q is in $CQ_0$.

There are examples of schemas, mappings, target functional dependencies, and target CQ query q for which the rewriting r that is generated by the extended methodology does not satisfy $q(J) \subseteq r(I)$. This follows from well-known results that provide that, for relational settings, one needs recursion in order to obtain the complete set of the certain answers, in the case when functional dependencies are allowed in the target. This holds in the case according to the embodiments of the invention as well since the scenarios that are considered generalize the relational LAV scenario of the well-known techniques. The embodiments of the invention do not consider recursion as an acceptable choice for the language of rewritings, as one of the objects of the embodiments of the invention is to generate rewritings that can be expressed using the core fragments of SQL or XQuery and, hence, can be efficiently optimized and executed. There are many examples of settings with target NEGDs for which the generated rewritings are in fact complete (the examples shown in this paper, and others). Furthermore, experimental results generated with the implemented system provided by the embodiments of the invention indicate that even for the cases where the generated rewritings are incomplete, the answers that are generated are very close approximations to the complete set of answers.

The following gives a bound on the number of rewritings explored by the extended methodology, for a given $CQ_0$ query. Here, let k be the size (number of variables, number of conditions in the where clause, and number of expressions in the return clause) of an input $CQ_0$ query. Let M be the maximum size of a mapping (number of variables in the for clause). Let n be the number of mappings, let s be the maximum size of a target NEGD (number of variables), and let r be the number of target NEGDs. Moreover, it is assumed that the set F of translated constraints is acyclic. In that case, let f and h be the maximal fan-out and, respectively, the maximum length of a path in the directed acyclic graph associated to F. Then the number of rewritings generated and explored by the extended rewriting methodology is $O(n^k \times (Mkn^s r)^{Mkf^h})$. This number is still a polynomial in the number of mappings, if the other parameters are considered fixed. This is the same as in the case of using QueryTranslate alone (although the degree is higher now). In terms of the input query size, the complexity is higher now (exponential in k log k, as opposed to just exponential in k).

The performance of the query rewriting system provided by the embodiments of the invention is evaluated using a comprehensive set of experiments, including two synthetic mapping scenarios and one real world scenario. As demonstrated, the system scales well with the increasing mapping and query complexities in the synthetic scenarios and is capable of efficiently rewriting a set of common queries in the real scenario. The system is implemented in Java®, available from Sun Microsystems, Inc., Santa Clara, Calif., USA, and all experiments are performed on a PC-compatible machine, with a single 2.0 GHz P4 CPU and 512 MB RAM, running Windows® XP (SP1), available from Microsoft Corporation, Redmond, Wash., USA, and Java® JRE 1.4.1®, available from Sun Microsystems, Inc., Santa Clara, Calif., USA. Each experiment is repeated five times and the average of the five is used as the measurement.

Two scenarios, chain and authority, shown in FIG. 11 are designed to evaluate the performance of the system along two major dimensions: the mapping complexity, measured by the number of elements and referential relationships in a single source schema and the number of independent sources that are mapped to the target schema, and the query complexity, measured as the number of levels of nested subqueries (and indirectly, the number of variables) in the query. The chain scenario simulates the case where multiple interlinked relational tables are mapped into an XML target with large number of nesting levels (depth). The authority scenario simulates the case where multiple relational tables referencing a central table are mapped into a shallow XML target with a large branching factor (number of children). Three queries are designed for each scenario: two of them (Q1 and Q2) have different number of variables in the for clause (shown in FIG. 11), and one (Q3) has an adjustable level of nested subqueries (Q3 is not shown). A target constraint is defined on the authority scenario to be used in evaluating the performance of the QueryResolution methodology. In addition to these two scenarios, another scenario is designed that is the reverse of the chain scenario; i.e., the XML schemas are used as the sources and the relational schema is used as the target. The results for this scenario are similar to those for the chain scenario.

Figure 12A:
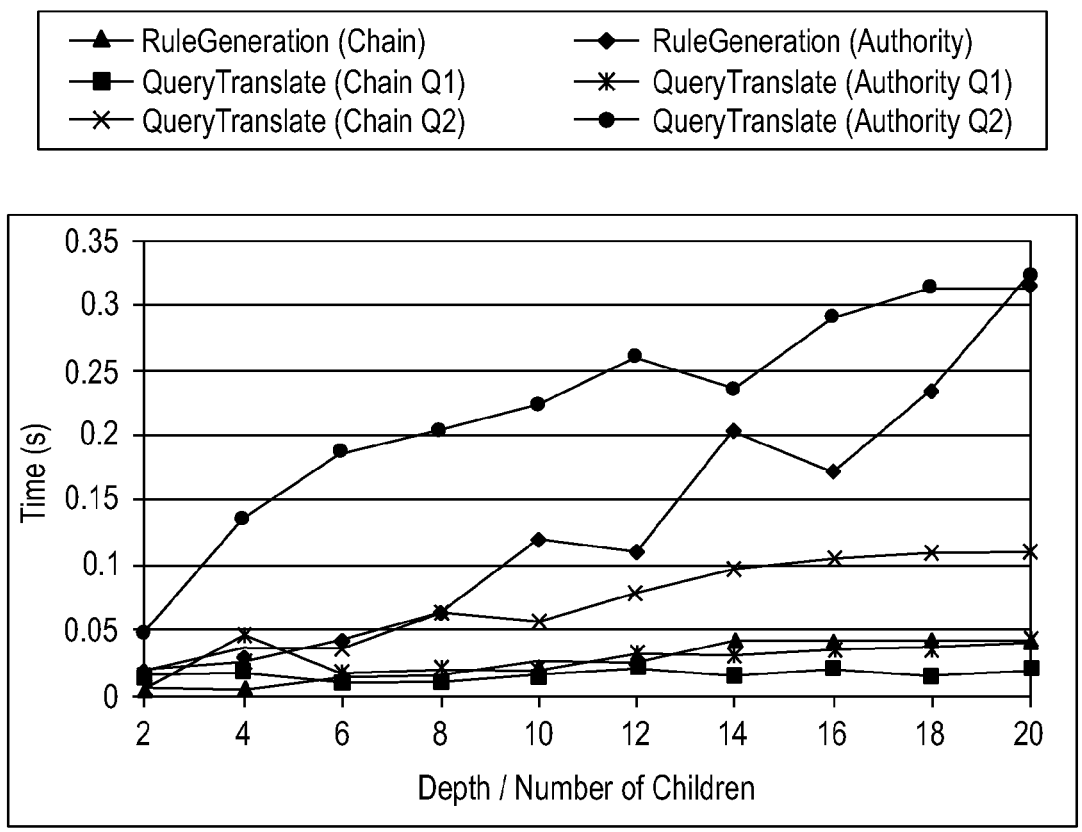
FIGS. 12(A) and 12(B) are graphical representations illustrating the performance of rewriting queries according to an embodiment of the invention.
Figure 12B:
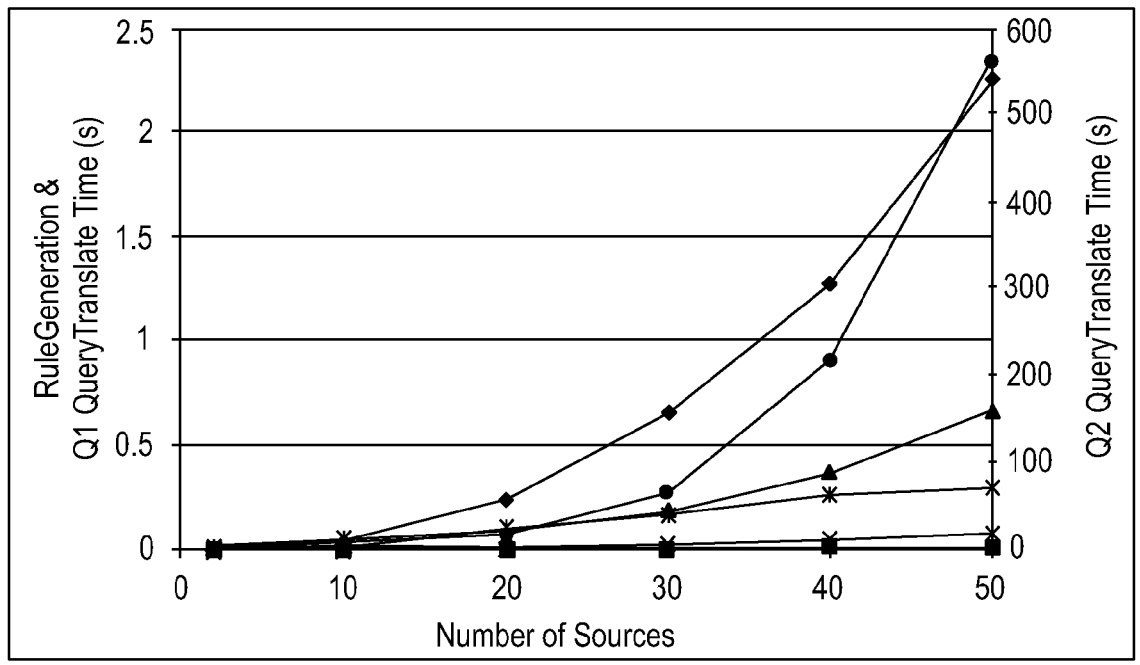

FIGS. 12(A) and 12(B) demonstrate the performance of Rule-Generation and QueryTranslate on rewriting Q1 and Q2 in both scenarios with the increasing mapping complexity. The upper limit on the depth or number of children (also called single schema complexity) is set to 20 as it is believed that this is a reasonably high estimate for real schemas (the system can easily scale up to 40 children or levels deep, costing under 10 seconds for either RuleGeneration or QueryTranslate). As shown in FIGS. 12(A) and 12 (B), the Rule-Generation methodology scales well with both the increasing single schema complexity and the increasing number of sources in the mapping scenario (it takes less than 2.5 seconds with 50 sources and depth/number of children equal to 3). QueryTranslate scales well for both queries with the increasing single schema complexity and for the single-variable query with increasing number of sources. For the three-variable query, the cost of QueryTranslate increases quickly (but is still acceptable) with the increasing number of sources (approximately 10 minutes with 50 sources for authority Q2). This is due to the large number of possible ways to substitute a target generator, which produces many potential source queries that are invalidated later.

Figure 13A:
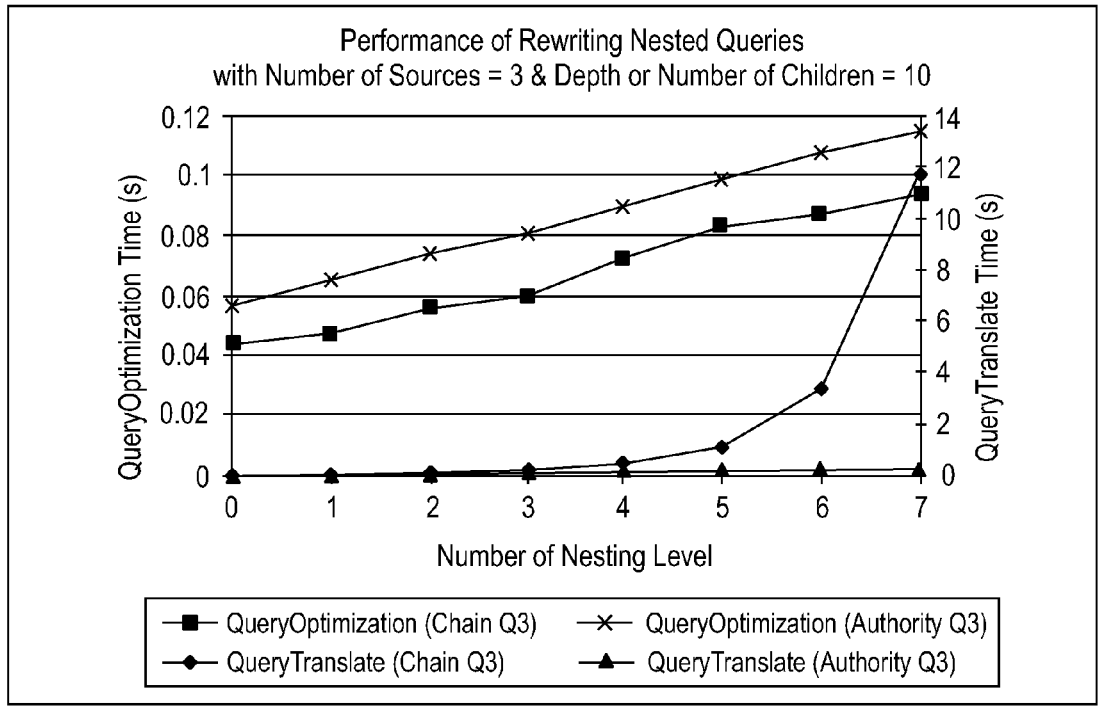
FIG. 13(A) is a graphical representation illustrating the performance of rewriting queries with an increasing nesting level according to an embodiment of the invention.

FIG. 13(A) shows the performance of rewriting queries with an increasing nesting level (Q3). The subquery at each level contains a single-variable for clause in both chain and authority scenarios. The QueryTranslate methodology scales well with the increasing levels of nesting, taking less than 12 seconds for a 7-level nested query in the chain scenario. The cost is mainly affected by the number of produced (decorrelated) queries: the largest number of produced queries is 9,840 for chain Q3 and 840 for authority Q3, which account for the performance differences between the two (y axis on the right). The performance of RuleGeneration is not affected by the query complexity.

Figure 13B:
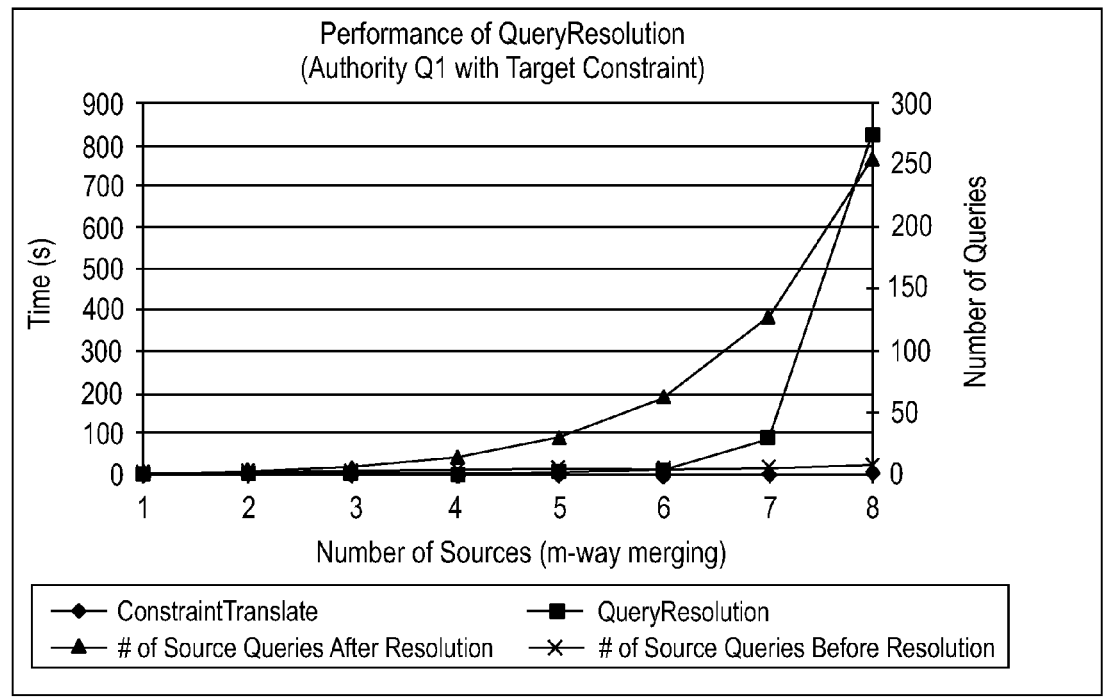
FIG. 13(B) is a graphical representation illustrating the results of rewriting a merging query according to an embodiment of the invention.

The performance of the QueryResolution methodology is also evaluated using the authority scenario with a single child in each source schema and the target constraint shown in FIG. 11. The results of rewriting the merging query Q1 are shown in FIG. 13(B). As expected, the number of valid source queries being produced increases with number of sources. The total time cost for the QueryResolution methodology increases accordingly.

Although synthetic scenarios can assist in analyzing the behavior of the system, real world examples are necessary to test its practicality. In this regard, the performance of the system is measured using a real data integration scenario from the life sciences domain. Two prominent and well-known protein-protein interaction databases, Biomolecular Interaction Network Database (BIND) and Database of Interacting Proteins (DIP), are integrated into a single centralized database. The mapping scenario (from BIND and DIP to the central target schema) is extracted and five queries that are representatives of those commonly asked by the biologists are chosen for rewriting (shown in FIG. 14 is one of the five queries). The three schemas (all are XML schemas) contain a total of approximately 500 elements with a maximum depth of 17 and a maximum fan-out of 13. The mapping scenario contains four logical mappings with three to ten variables in both foreach and exists clauses for each mapping, and two target key constraints identifying components of a protein (or its interaction partner) given the id. FIG. 14 shows the time cost for each component of the system provided by the embodiments of the invention to rewrite the five representative queries. Each of those queries is rewritten into four to eight valid source queries, while the total number of produced (decorrelated) queries, valid or invalid, ranges from 16 to 2,560. Each of the five queries is rewritten by the system in a total of approximately 60 seconds, with query 4 being the longest one to finish, taking 69.5 seconds.

Figure 15:
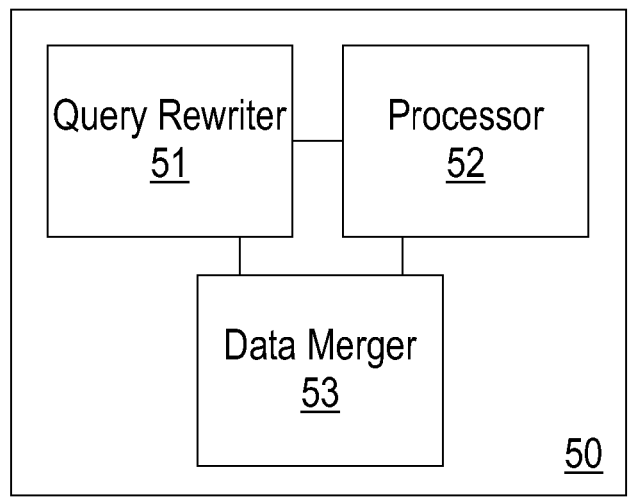
FIG. 15 is a schematic diagram of a system according to an embodiment of the invention.

FIG. 15 illustrates a system 50 of integrating data comprising a query rewriter 51 adapted to rewrite an XQuery comprising a target XML schema into a set of queries comprising XML source schemas comprising data; a processor 52 adapted to consider data merging rules expressed as XML target constraints; and a data merger 53 adapted to merge, using the data merging rules, the data by evaluating data joins between multiple XML source schemas.

Figure 16:
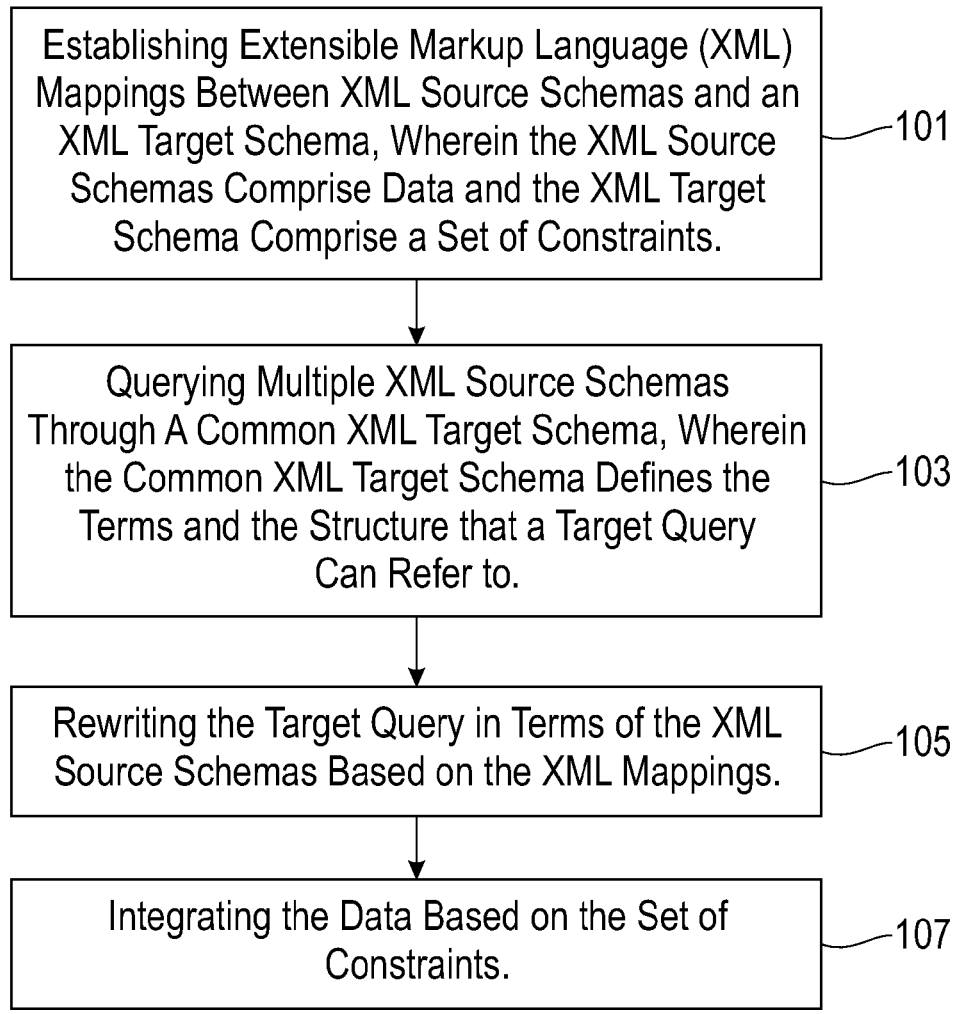
FIG. 16 is a flow diagram illustrating a preferred method according to an embodiment of the invention.

FIG. 16, with reference to FIGS. 1 through 15, illustrates a flow diagram for a method of data integration comprising establishing (101) extensible markup language (XML) mappings between XML source schemas and an XML target schema, wherein the XML source schemas comprise data and the XML target schema comprise a set of constraints; querying (103) multiple XML source schemas through a common XML target schema, wherein the common XML target schema defines the terms (set of terms) and the structure that a target query can refer to; rewriting (105) the target query in terms of the XML source schemas based on the XML mappings; and integrating (107) the data based on the set of constraints, wherein the set of constraints comprise data merging rules for integrating the data from multiple XML source schemas comprising overlapping information. The method further comprises rewriting the target query into a set of source queries comprising the source XML schemas and evaluating a union of the set of source queries, wherein the evaluation of the union of the set of source queries occurs at query run-time. Moreover, the target query comprises an XML query (XQuery), the XML source schemas comprise any of relational and hierarchical XML schemas, and the XML mappings comprise lossy mappings.

Figure 17:
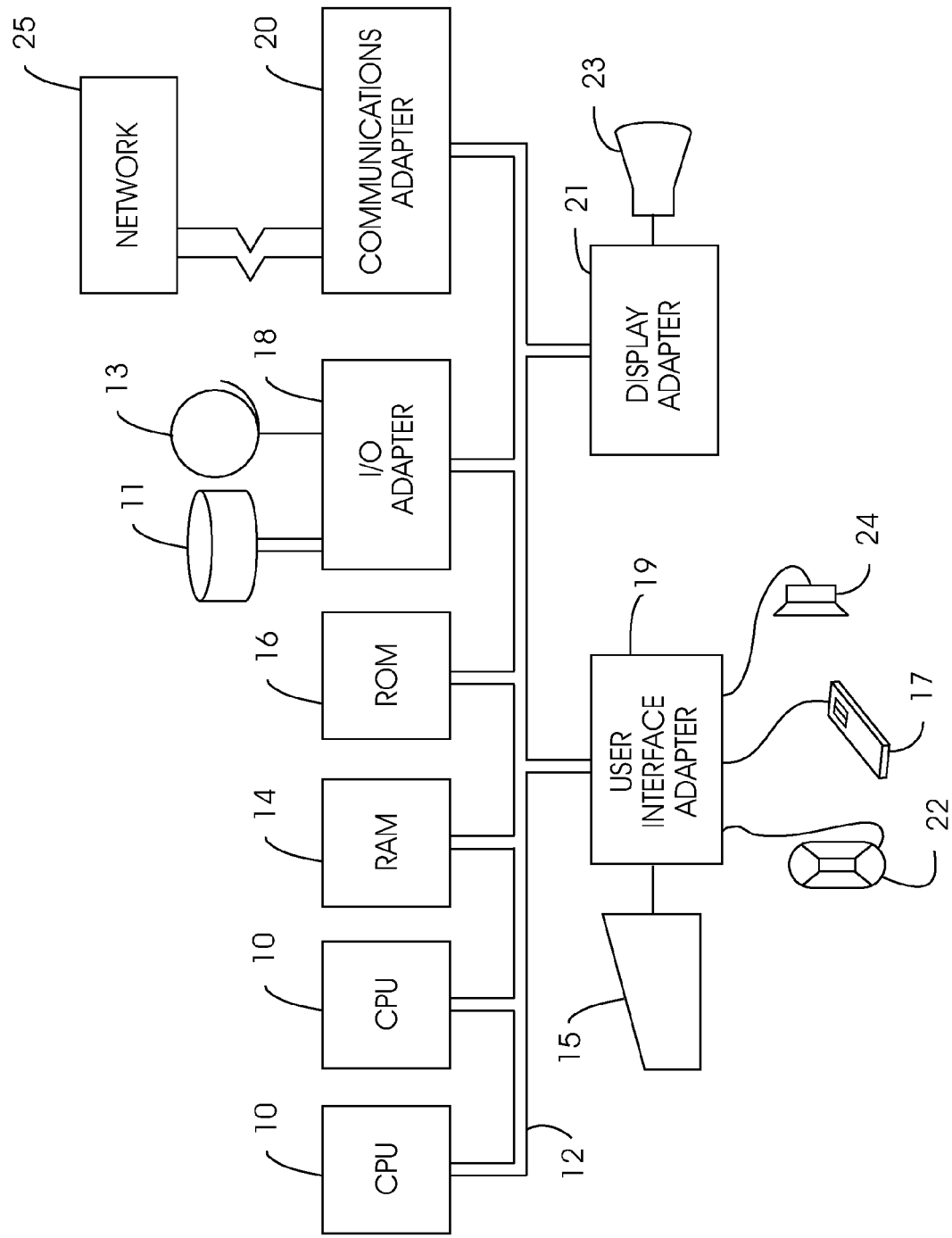
FIG. 17 is a schematic diagram of a computer system according to an embodiment of the invention.

A representative hardware environment for practicing the embodiments of the invention is depicted in FIG. 17. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

With regard to the semantics of query answering, the embodiments of the invention define what it means to answer a target query in the best way, given a set of mappings between the source schemas and the target schema, and given a set of target constraints. The embodiments of the invention define a canonical target instance that satisfies all the requirements (mappings and target constraints) with respect to the given source instances, and the embodiments of the invention take the semantics of query answering to be the result of evaluating the query on this canonical instance. While building on conventional techniques on relational data exchange, the semantics provided by the embodiments of the invention capture not only relational settings but nested (XML) settings as well. It then becomes a requirement that the embodiments of the invention impose on the subsequent basic query rewriting and query resolution methodologies.

Next, with regard to the basic query rewriting methodology, the methodology provided by the embodiments of the invention rewrites the target query into a set of source queries. Evaluating the union of these queries on the data sources has essentially the same effect as running the target query on the canonical target instance, provided that there are no target constraints. The methodology provided by the embodiments of the invention extend conventional relational techniques for rewriting queries using views, with novel techniques for XML query rewriting that are based on XML mappings between XML schemas. Dealing with XML is a significant extension over the previous work as it requires handling of a variety of complex types and queries as well as the hierarchical structure that the relational model does not have. Furthermore, the experimental results tend to prove that the methodology provided by the embodiments of the invention is complete, in the sense that the resulting rewritings retrieve all the answers, according to the semantics given by the canonical target instance. As such, the embodiments of the invention provide the first complete methodology and system to perform query rewriting based on mappings by operating directly on nested structures. The class of queries that are considered is a considerable fragment of XQuery that includes nested subqueries.

With regard to the query resolution methodology, the methodology provided by the embodiments of the invention extends the above one by taking into account target constraints to generate additional source queries to produce merged results. Such merged results are among those that would be obtained by running the target query on the target canonical instance, which is constructed based on the mappings and the target constraints. The constraints that are considered are NEGDs and they include functional dependencies in relational or nested schemas, XML Schema key constraints, and more general constraints stating that certain tuples/elements in the target must satisfy certain equalities.

As previously mentioned, in some of the conventional solutions, the source (materialized views, relational store, etc.) to target (XML logical schema, XML view, etc.) mapping is lossless; i.e., it consists of statements (whether explicit or implicit) each asserting that some portion of the XML data is equal to some portion of the relational (store) data. Hence, query rewriting is equivalence preserving. In contrast, the query rewriting that is provided by the embodiments of the invention involves lossy or incomplete mappings, where each statement asserts that some portion of a source is a subset of some portion of the target. Thus, the conventional data sources and the mappings offer an incomplete, partial, view of the world. As a consequence of this incompleteness, one of the goals of query rewriting provided by the embodiments of the invention is obtaining contained rewritings (and possibly maximally-contained rewritings) instead of equivalent rewritings (which may not exist). For the design of scalable data integration systems, having lossy mappings is a real-life necessity.

Usually, each source to target mapping is defined independently of other mappings or data sources and involves only a part of the target schema. The advantage of this design is its modularity and scalability: new mappings (and target constraints) can be easily added into the system provided by the embodiments of the invention without affecting other mappings and constraints. It is the run-time (i.e., the query answering system) that takes the responsibility of assembling a coherent view of the world out of the many mappings and constraints on the target. Moreover, contrary to the conventional solutions, the techniques provided by the embodiments of the invention operate directly at the XML level and form the basis for an integrated solution for XML query rewriting in the presence of both lossy mappings and target constraints.

The solution provided by the embodiments of the invention presents the first mapping and constraint based XML query rewriting system. The techniques provided by the embodiments of the invention can be applied in various XML or relational data integration scenarios for answering queries through a virtual target schema. The semantics of such query answering in the presence of both mappings and target constraints is defined and used as the basis for the system. Mappings can be incomplete, and this gives flexibility to the design of the data integration system. The incorporation of target constraints ensures that various parts of the same data entity, though residing at different sources, are merged and presented to the user as a whole. Two novel methodologies are implemented: the basic query rewriting methodology transforms target queries into source queries based on mappings, while the query resolution methodology generates additional source queries to merge related data based on the constraints. Moreover, experimental evaluation demonstrate that the system scales well with increasing complexities of the mapping scenario and the target query, and is practical in a real data integration scenario drawn from the life sciences domain.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the embodiments of the invention can be practiced with modification within the spirit and scope of the appended claims.

What is claimed is:

1. A system for automated data integration by querying multiple extensible markup language (XML) source schemas through a common XML target schema, said system comprising:
   a processor that:
      establishes XML mappings between said XML source schemas and said XML target schema,
         wherein said XML source schemas comprise data, and
         wherein said XML target schema comprise a set of constraints, said set of constraints comprising:
            data merging rules for integrating said data from multiple said XML source schemas comprising overlapping information; and
            nested equality-generating dependencies (NEGDs), said NEGDs comprising rules specifying that fields in two different data tuples must be merged;
      queries multiple XML source schemas through a common XML target schema;
      rewrites said target query in terms of said XML source schemas based on said XML mappings;
      integrates said data based on said set of constraints; and
      evaluates a union of a set of source queries, wherein an evaluation of said union of said set of source queries in said processor occurs at query run-time; and
   a display device adapted to display said target query and said data to a user.

2. The system according to claim 1, wherein said processor rewrites said target query into a set of source queries comprising said source XML schemas.

3. The system according to claim 1, wherein said target query comprises an XML query (XQuery).

4. The system according to claim 1, wherein said XML source schemas comprise any of relational and hierarchical XML schemas.

5. The system according to claim 1, wherein said XML mappings comprise lossy mappings.

6. The system according to claim 1, wherein said NEGDs capture XML Schema key constraints and forms that are not expressible by said XML source schemas and said XML target schema.

7. A method of automated data integration comprising:
   establishing extensible markup language (XML) mappings between XML source schemas and an XML target schema,
      wherein said XML source schemas comprise data; and
      wherein said XML target schema comprises a set of constraints, said set of constraints comprising:
         data merging rules for integrating said data from multiple said XML source schemas comprising overlapping information; and
         nested equality-generating dependencies (NEGDs), said NEGDs comprising rules specifying that fields in two different data tuples must be merged;
   querying multiple XML source schemas through a common XML target schema, wherein said common XML target schema defines a set of terms and a structure that a target query refers to;
   rewriting said target query in terms of said XML source schemas based on said XML mappings;
   integrating said data based on said set of constraints;
   evaluating a union of a set of source queries, wherein said evaluating occurs at query run-time; and
   displaying results of said rewriting and said integrating to a user.

8. The method according to claim 7, further comprising rewriting said target query into a set of source queries comprising said source XML schemas.

9. The method according to claim 7, wherein said target query comprises an XML query (XQuery).

10. The method according to claim 7, wherein said XML source schemas comprise any of relational and hierarchical XML schemas.

11. The method according to claim 7, wherein in the establishing process, said XML mappings comprise lossy mappings.

12. The method according to claim 7, wherein said NEGDs capture XML Schema key constraints and forms that are not expressible by said XML source schemas and said XML target schema.

13. A program storage device readable by computer, tangibly embodying a program of instructions executable by said computer to perform a method of automated data integration, said method comprising:
   establishing extensible markup language (XML) mappings between XML source schemas and an XML target schema,
      wherein said XML source schemas comprise data; and
      wherein said XML target schema comprises a set of constraints, said set of constraints comprising:
         data merging rules for integrating said data from multiple said XML source schemas comprising overlapping information; and
         nested equality-generating dependencies (NEGDs), said NEGDs comprising rules specifying that fields in two different data tuples must be merged;
   querying multiple XML source schemas through a common XML target schema, wherein said common XML target schema defines a set of terms and a structure that a target query refers to;
   rewriting said target query in terms of said XML source schemas based on said XML mappings;
   integrating said data based on said set of constraints evaluating a union of a set of source queries, wherein said evaluating occurs at query run-time; and
   displaying results of said rewriting and said integrating to a user.

14. The program storage device according to claim 13, further comprising rewriting said target query into a set of source queries comprising said source XML schemas.

15. The program storage device according to claim 13, wherein said target query comprises an XML query (XQuery).

16. The program storage device according to claim 13, wherein said XML source schemas comprise any of relational and hierarchical XML schemas.

17. The program storage device according to claim 13, wherein said XML mappings comprise lossy mappings.

18. The program storage device according to claim 13, wherein said NEGDs capture XML Schema key constraints and forms that are not expressible by said XML source schemas and said XML target schema.

19. A method of automatically integrating data comprising:
rewriting an extensible markup language (XML) query (XQuery) comprising a target XML schema into a set of queries comprising XML source schemas comprising data;
implementing data merging rules expressed as XML target constraints for said XML target schema,
wherein said data merging rules integrate data from multiple said XML source schemas comprising overlapping information; and
wherein said target constraints comprise nested equality-generating dependencies (NEGDs), and said NEGDs comprise rules specifying that fields in two different data tuples must be merged;
merging, using said data merging rules, said data by evaluating data joins between multiple XML source schemas;
evaluating a union of a set of source queries, wherein said evaluating occurs at query run-time; and
displaying results of said merging to a user.

20. The method according to claim 19, wherein said NEGDs capture XML Schema key constraints and forms that are not expressible by said XML source schemas and said XML target schema.

21. A system of automatically integrating data comprising:
a processor that:
rewrites an extensible markup language (XML) query (XQuery) comprising a target XML schema into a set of queries comprising XML source schemas comprising data;
implements data merging rules expressed as XML target constraints for said XML target schema,
wherein said data merging rules integrate data from multiple said XML source schemas comprising overlapping information; and
wherein said target constraints comprise nested equality-generating dependencies (NEGDs), and said NEGDs comprise rules specifying that fields in two different data tuples must be merged;
merges, using said data merging rules, said data by evaluating data joins between multiple XML source schemas;
evaluates a union of a set of source queries, wherein said evaluating occurs at query run-time; and
a display that displays said data to a user.

22. The system according to claim 21, wherein said NEGDs capture XML Schema key constraints and forms that are not expressible by said XML source schemas and said XML target schema.

\* \* \* \* \*

UNITED STATES PATENT AND TRADEMARK OFFICE
CERTIFICATE OF CORRECTION

PATENT NO.      : 7,596,559 B2
APPLICATION NO. : 10/975213
DATED           : September 29, 2009
INVENTOR(S)     : Popa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 449 days.

Signed and Sealed this

Twenty-eighth Day of September, 2010

David J. Kappos
*Director of the United States Patent and Trademark Office*